(12) United States Patent
Fujiki et al.

(10) Patent No.: US 9,287,567 B2
(45) Date of Patent: Mar. 15, 2016

(54) ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: Sony Corporation, Tokyo (JP)

(72) Inventors: Satoshi Fujiki, Fukushima (JP); Asuki Yanagihara, Fukushima (JP); Yosuke Hosoya, Fukushima (JP); Guohua Li, Saitama (JP)

(73) Assignee: SONY CORPORATION, Tokyo (JP)

( * ) Notice: Subject to any disclaimer, the term of this patent is extended or adjusted under 35 U.S.C. 154(b) by 410 days.

(21) Appl. No.: 13/691,112

(22) Filed: Nov. 30, 2012

(65) Prior Publication Data

US 2013/0149604 A1    Jun. 13, 2013

(30) Foreign Application Priority Data

Dec. 8, 2011  (JP) ................. 2011-269095

(51) Int. Cl.

| | |
|---|---|
| *H01M 4/66* | (2006.01) |
| *H01M 4/131* | (2010.01) |
| *H01M 4/136* | (2010.01) |
| *H01M 4/36* | (2006.01) |
| *H01M 4/505* | (2010.01) |
| *H01M 4/525* | (2010.01) |
| *H01M 4/58* | (2010.01) |
| *H01M 10/0525* | (2010.01) |
| *H01M 10/052* | (2010.01) |
| *H01M 4/02* | (2006.01) |

(52) U.S. Cl.
CPC .............. *H01M 4/667* (2013.01); *H01M 4/131* (2013.01); *H01M 4/136* (2013.01); *H01M 4/366* (2013.01); *H01M 4/505* (2013.01); *H01M 4/525* (2013.01); *H01M 4/5825* (2013.01); *H01M 10/052* (2013.01); *H01M 10/0525* (2013.01); *H01M 2004/021* (2013.01); *H01M 2004/028* (2013.01); *H01M 2220/10* (2013.01); *H01M 2220/20* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 2004/0248003 A1* | 12/2004 | Tsutsumi et al. | ............. 429/209 |
| 2007/0080661 A1* | 4/2007 | Nakashima et al. | .......... 320/107 |
| 2007/0111098 A1* | 5/2007 | Yang Kook et al. | ..... 429/231.95 |
| 2010/0078591 A1* | 4/2010 | Sano et al. | ................. 252/182.1 |

(Continued)

FOREIGN PATENT DOCUMENTS

| | | |
|---|---|---|
| JP | 2001-338639 | 12/2001 |
| JP | 2002-274853 | 9/2002 |

(Continued)

*Primary Examiner* — Jeremiah Smith
(74) *Attorney, Agent, or Firm* — Hazuki International, LLC

(57) ABSTRACT

A secondary battery includes: a cathode including a cathode active material layer on a cathode current collector; an anode; and an electrolytic solution. The cathode active material layer includes spherical active materials each being a secondary particle and planular active materials each being a secondary particle. The spherical active materials are each included in a region closer to the cathode current collector, and the planular active materials are each included in a region farther from the cathode current collector. Primary particles of the spherical active materials have an average particle diameter that is larger than an average particle diameter of primary particles of the planular active materials.

11 Claims, 7 Drawing Sheets

(56) References Cited

U.S. PATENT DOCUMENTS

| | | | |
|---|---|---|---|
| 2010/0124706 A1* | 5/2010 | Hirose et al. | 429/331 |
| 2010/0124707 A1* | 5/2010 | Hirose et al. | 429/331 |
| 2011/0309291 A1* | 12/2011 | Sugiura et al. | 252/182.1 |
| 2011/0318641 A1* | 12/2011 | Sugiura et al. | 429/231.8 |
| 2013/0045424 A1* | 2/2013 | Sugiura et al. | 429/231.8 |
| 2013/0071748 A1* | 3/2013 | Okada et al. | 429/223 |

FOREIGN PATENT DOCUMENTS

| | | |
|---|---|---|
| JP | 2007-035589 | 2/2007 |
| JP | 2007-242282 | 9/2007 |
| JP | 2008-541364 | 11/2008 |
| JP | 4190930 | 12/2008 |
| JP | 2009-245827 | 10/2009 |

* cited by examiner

ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCES TO RELATED APPLICATIONS

The present application claims priority to Japanese Priority Patent Application JP 2011-269095 filed in the Japan Patent Office on Dec. 8, 2011, the entire content of which is hereby incorporated by reference.

BACKGROUND

The present application relates to an electrode that includes an active material layer on a current collector and to a secondary battery that uses the electrode. The present application further relates to a battery pack, an electric vehicle, an electric power storage system, an electric power tool, and an electronic apparatus that use the secondary battery.

In recent years, various electronic apparatuses such as mobile phones and personal digital assistants (PDAs) have been widely used, and it has been demanded to further reduce the size and the weight of the electronic apparatuses and to achieve their long life. Accordingly, a battery, in particular, a small and light-weight secondary battery capable of providing high energy density has been developed as an electric power source. In these days, it has been considered to apply such a secondary battery to various other applications that may include, for example, battery packs attachably and detachably mounted on the electronic apparatuses or the like, electric vehicles such as electric automobiles, electric power storage systems such as home electric power servers, and electric power tools such as electric drills.

As secondary batteries, secondary batteries that obtain a capacity by utilizing various charge and discharge principles have been proposed. Specifically, secondary batteries that utilize insertion and extraction of electrode reactants such as lithium ions are considered promising, since such secondary batteries provide higher energy density than batteries such as lead batteries and nickel cadmium batteries.

A secondary battery includes a cathode, an anode, and an electrolytic solution. The cathode includes a cathode active material layer on a cathode current collector. The cathode active material layer includes a cathode active material that contributes to charge and discharge reactions. As the cathode active material, for example, a lithium composite oxide such as $LiCoO_2$, $LiNiO_2$, and $LiMn_2O_4$, a lithium phosphate compound such as $LiFePO_4$, or the like may be typically used.

The cathode is typically formed by the following procedures. First, a cathode active material and a material such as a cathode binder are dispersed to an organic solvent, to thereby obtain slurry. Subsequently, the slurry is coated on a cathode current collector, and the resultant is then dried to form a cathode active material layer. Lastly, the cathode active material layer is compression-molded with the use of, for example, a roll-pressing machine and/or the like.

The configuration of the cathode largely influences the performance of the secondary battery. Therefore, various studies have been made on the configuration of the cathode. For example, to obtain superior charge and discharge characteristics, a lithium metal phosphate compound ($Li_xA_yPO_4$, where A is an element such as Fe, and x and y satisfy $0<x<2$ and $0<y\leq1$) with a minute particle diameter, or a compound that has a predetermined X-ray diffraction characteristics ($LiMPO_4$, where M is an element such as Fe) are used (for example, see Japanese Patent No. 4190930 and Japanese Unexamined Patent Application Publication (Translation of PCT Application) No. 2008-541364). To improve overcharge characteristics etc., for example, the cathode active material layer that includes a plurality of layers is formed, or the compositions of the cathode active materials in the respective layers are made different from one another (for example, see Japanese Unexamined Patent Application Publication Nos. 2007-035589, 2009-245827, and 2001-338639). To improve handling in preparing the electrode, for example, a lithium manganese composite oxide ($Li_aMn_bO_4$, where a and b satisfy $1\leq a\leq1.2$, and $1.5\leq b\leq2$) is used as the cathode active material, and a degree of circularity of a second particle (projection image) of the cathode active material is employed (for example, see Unexamined Japanese Patent Application Publication No. 2002-274853). It is to be noted that a degree of circularity of an anode active material such as natural graphite (granulated body) is employed in addition to that of the cathode active material (for example, see Japanese Unexamined Patent Application Publication No. 2007-242282).

SUMMARY

Adhesive characteristics of a cathode active material layer with respect to a cathode current collector and battery characteristics such as load characteristics vary due to a particle diameter of a cathode active material. Therefore, suppression of exfoliation of the cathode active material layer and improvement in the battery characteristics are in a so-called trade-off relation.

It is desirable to provide an electrode, a secondary battery, a battery pack, an electric vehicle, an electric power storage system, an electric power tool, and an electronic apparatus that are capable of both suppressing exfoliation of the active material layer and improving the battery characteristics.

According to an embodiment of the present application, there is provided an electrode including an active material layer on a current collector. The active material layer includes spherical active materials each being a secondary particle and planar active materials each being a secondary particle. The spherical active materials are each included in a region closer to the current collector, and the planar active materials are each included in a region farther from the current collector. Primary particles of the spherical active materials have an average particle diameter that is larger than an average particle diameter of primary particles of the planar active materials. Here, "average particle diameter" refers to a median diameter (D50).

According to an embodiment of the present application, there is provided a secondary battery including: a cathode including a cathode active material layer on a cathode current collector; an anode; and an electrolytic solution. The cathode active material layer includes spherical active materials each being a secondary particle and planar active materials each being a secondary particle. The spherical active materials are each included in a region closer to the cathode current collector, and the planar active materials are each included in a region farther from the cathode current collector. Primary particles of the spherical active materials have an average particle diameter that is larger than an average particle diameter of primary particles of the planar active materials.

According to an embodiment of the present application, there is provided a battery pack including: a secondary battery; a control section controlling a used state of the secondary battery, and a switch section switching the used state of the secondary battery according to an instruction of the control section. The secondary battery includes a cathode including a cathode active material layer on a cathode current collector, an anode, and an electrolytic solution. The cathode active material layer includes spherical active materials each being a secondary particle and planular active materials each being a secondary particle. The spherical active materials are each included in a region closer to the cathode current collector, and the planular active materials are each included in a region farther from the cathode current collector. Primary particles of the spherical active materials have an average particle diameter that is larger than an average particle diameter of primary particles of the planular active materials.

According to an embodiment of the present application, there is provided an electric vehicle including: a secondary battery; a conversion section converting electric power supplied from the secondary battery into drive power; a drive section operating according to the drive power; and a control section controlling a used state of the secondary battery. The secondary battery includes a cathode including a cathode active material layer on a cathode current collector, an anode, and an electrolytic solution. The cathode active material layer includes spherical active materials each being a secondary particle and planular active materials each being a secondary particle. The spherical active materials are each included in a region closer to the cathode current collector, and the planular active materials are each included in a region farther from the cathode current collector. Primary particles of the spherical active materials have an average particle diameter that is larger than an average particle diameter of primary particles of the planular active materials.

According to an embodiment of the present application, there is provided an electric power storage system including: a secondary battery; one or more electric devices supplied with electric power from the secondary battery; and a control section controlling the supplying of the electric power from the secondary battery to the one or more electric devices. The secondary battery includes a cathode including a cathode active material layer on a cathode current collector, an anode, and an electrolytic solution. The cathode active material layer includes spherical active materials each being a secondary particle and planular active materials each being a secondary particle. The spherical active materials are each included in a region closer to the cathode current collector, and the planular active materials are each included in a region farther from the cathode current collector. Primary particles of the spherical active materials have an average particle diameter that is larger than an average particle diameter of primary particles of the planular active materials.

According to an embodiment of the present application, there is provided an electric power tool including: a secondary battery; and a movable section being supplied with electric power from the secondary battery. The secondary battery includes a cathode including a cathode active material layer on a cathode current collector, an anode, and an electrolytic solution. The cathode active material layer includes spherical active materials each being a secondary particle and planular active materials each being a secondary particle. The spherical active materials are each included in a region closer to the cathode current collector, and the planular active materials are each included in a region farther from the cathode current collector. Primary particles of the spherical active materials have an average particle diameter that is larger than an average particle diameter of primary particles of the planular active materials.

According to an embodiment of the present application, there is provided an electronic apparatus including a secondary battery as an electric power supply source. The secondary battery includes a cathode including a cathode active material layer on a cathode current collector, an anode, and an electrolytic solution. The cathode active material layer includes spherical active materials each being a secondary particle and planular active materials each being a secondary particle. The spherical active materials are each included in a region closer to the cathode current collector, and the planular active materials are each included in a region farther from the cathode current collector. Primary particles of the spherical active materials have an average particle diameter that is larger than an average particle diameter of primary particles of the planular active materials.

According to the electrode and the secondary battery of the embodiments of the present application, in the active material layer (cathode active material layer), the average particle diameter (D50) of the primary particles of the spherical active materials that are located in the region closer to the current collector (cathode current collector) is larger than the average particle diameter (D50) of the primary particles of the planular active materials that are located in the region farther from the current collector. Therefore, both suppression of exfoliation of the active material layer and improvement in battery characteristics are achieved. Also, similar effects are obtained in the battery pack, the electric vehicle, the electric power storage system, the electric power tool, and the electronic apparatus according to the embodiments of the present application.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
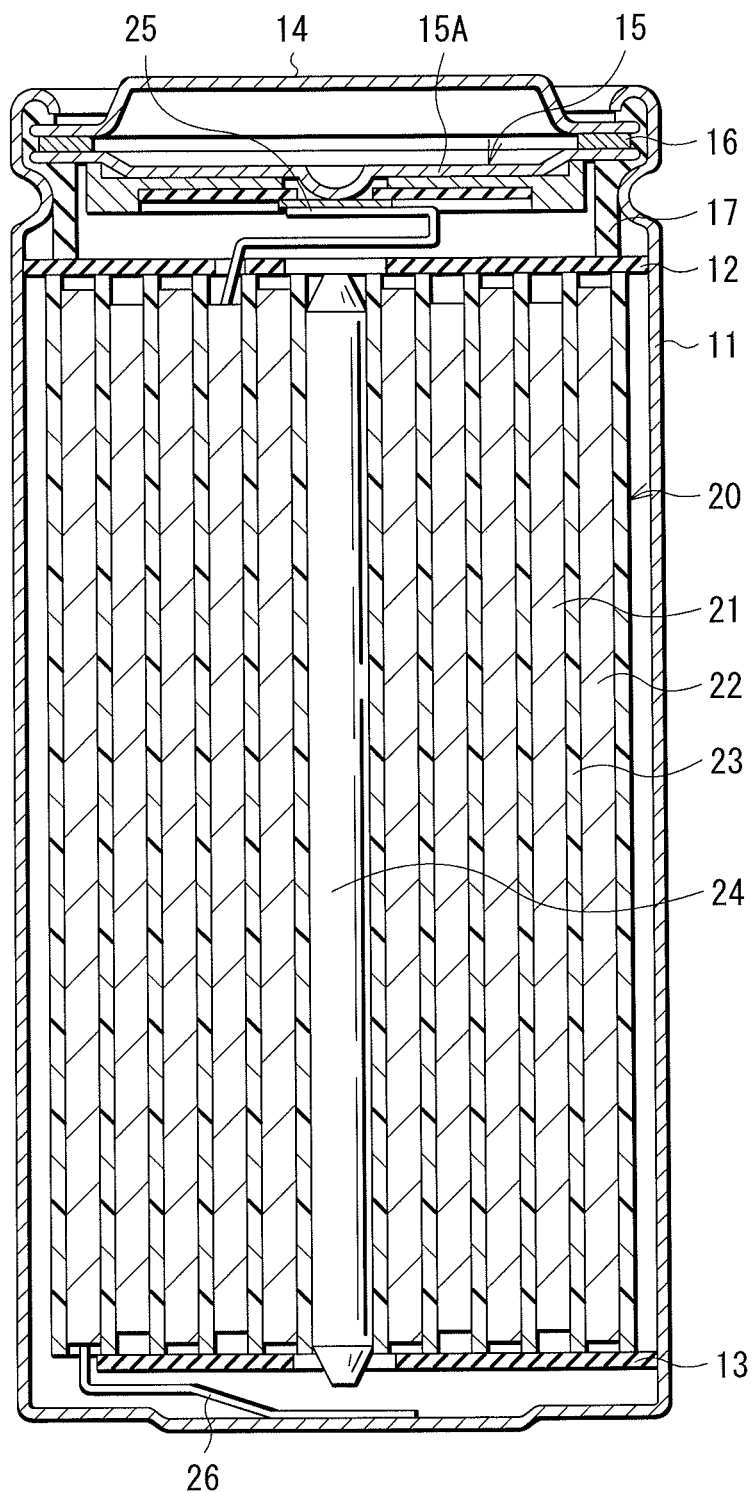
FIG. 1 is a cross-sectional view illustrating a configuration of a secondary battery (cylindrical type) that includes an electrode according to an embodiment of the present application.
Figure 2:
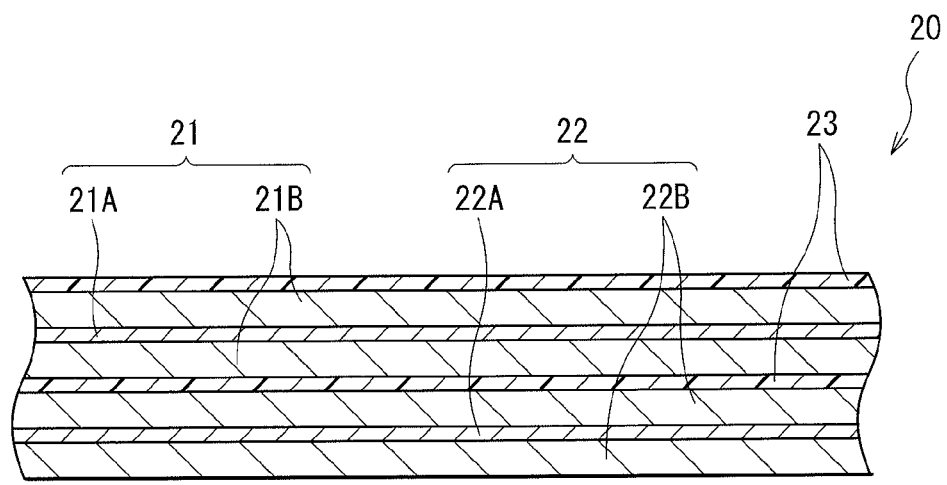
FIG. 2 is a cross-sectional view illustrating an enlarged part of a spirally wound electrode body shown in FIG. 1.
Figure 3:
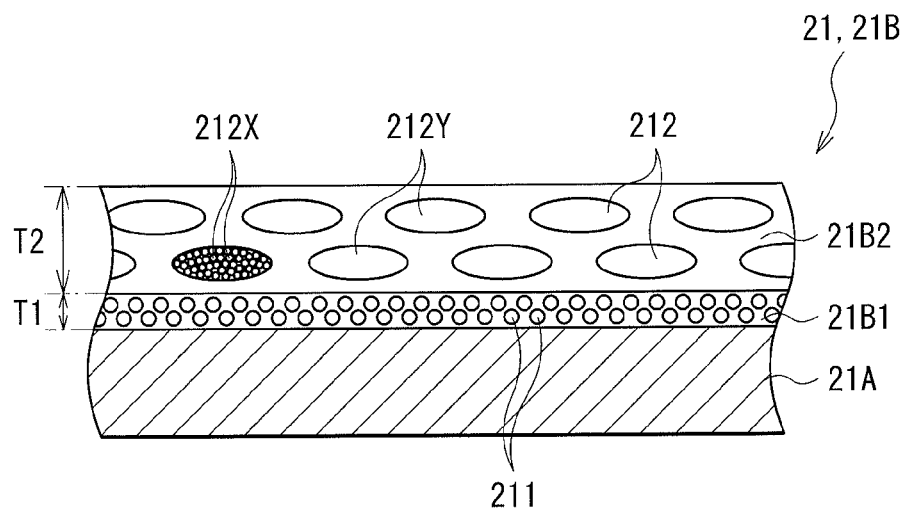
FIG. 3 is a cross-sectional view schematically illustrating an enlarged part of a configuration of a cathode shown in FIG. 2.

Preferred embodiments of the present application will be hereinafter described in detail with reference to the drawings. The description will be given in the following order.
1. Electrode and Secondary Battery
    1-1. Lithium Ion Secondary Battery (Cylindrical Type)
    1-2. Lithium Ion Secondary Battery (Laminated Film Type)
2. Applications of Secondary Battery
    2-1. Battery Pack
    2-2. Electric Vehicle
    2-3. Electric Power Storage System
    2-4. Electric Power Tool
[1. Electrode and Secondary Battery]
[1-1. Lithium Ion Secondary Battery (Cylindrical Type)]
FIGS. 1 to 3 illustrate cross-sectional configurations of a secondary battery that uses an electrode according to an embodiment of the present application. FIG. 2 illustrates an enlarged part of a spirally wound electrode body 20 shown in FIG. 1, and FIG. 3 schematically illustrates an enlarged part of a cathode 21 shown in FIG. 2.

[General Configuration of Secondary Battery]

The secondary battery of the present embodiment is a lithium ion secondary battery (hereinafter, simply referred to as "secondary battery") in which the capacity of an anode 22 is obtained by insertion and extraction of lithium (lithium ions) that is an electrode reactant. Here, the electrode according to the embodiment of the present application is used as the cathode 21, for example.

The secondary battery described in the present embodiment may be, for example, of a so-called cylindrical type as shown in FIG. 1. In the secondary battery, the spirally wound electrode body 20 and a pair of insulating plates 12 and 13 are contained in a battery can 11 that has a shape of a substantially hollow cylinder. The spirally wound electrode body 20 may be configured of, for example, the cathode 21 and the anode 22 that are laminated with a separator 23 in between and are spirally wound.

The battery can 11 has a hollow structure in which one end of the battery can 11 is closed and the other end thereof is opened. The battery can 11 may be formed of, for example, iron, aluminum, an alloy thereof, and/or the like. It is to be noted that the surface of the battery can 11 may be plated with a metal material such as nickel. The pair of insulating plates 12 and 13 is arranged so as to sandwich the spirally wound electrode body 20 in between, and so as to extend perpendicularly with respect to the spirally wound periphery surface thereof.

At the open end of the battery can 11, a battery cover 14, a safety valve mechanism 15, and a positive temperature coefficient device (PTC device) 16 are attached by being swaged with a gasket 17. The battery can 11 is hermetically sealed. The battery cover 14 may be formed of, for example, a material similar to that of the battery can 11. The safety valve mechanism 15 and the PTC device 16 are provided inside the battery cover 14. The safety valve mechanism 15 is electrically connected to the battery cover 14 through the PTC device 16. In the safety valve mechanism 15, when an internal pressure becomes a certain level or higher, for example, due to internal short circuit, external heating, and/or the like, a disk plate 15A inverts to cut electric connection between the battery cover 14 and the spirally wound electrode body 20. The PTC device 16 prevents abnormal heating resulting from a large current. The PTC device 16 is so configured that the resistance thereof is increased as the temperature rises. The gasket 17 may be formed of, for example, an insulating material. The surface of the gasket 17 may be coated with asphalt, for example.

A center pin 24 may be inserted in the center of the spirally wound electrode body 20. The cathode 21 may be connected to, for example, a cathode lead 25 formed of an electrically-conductive material such as aluminum, and the anode 22 may be connected to, for example, an anode lead 26 formed of an electrically-conductive material such as nickel. The cathode lead 25 may be welded to the safety valve mechanism 15 and may be electrically connected to the battery cover 14, for example. The anode lead 26 may be welded to the battery can 11 and may be electrically connected to the battery can 11, for example.

[Cathode]

The cathode 21 may be configured of, for example, a cathode current collector 21A and a cathode active material layer 21B that is provided on (one or both faces of) the cathode current collector 21A, as shown in FIG. 2. The cathode current collector 21A may be formed of, for example, an electrically-conductive material such as aluminum, nickel, and stainless steel.

The cathode active material layer 21B includes, as a cathode active material, one or more of cathode materials that are capable of inserting and extracting lithium ions. The cathode active material layer 21B may further include other materials such as a cathode binder and a cathode conductive agent.

The cathode active material layer 21B includes a plurality of spherical cathode materials (spherical active materials 211 that are secondary particles) in a region closer to the cathode current collector 21A, and includes a plurality of planar cathode materials (planar active materials 212 that are secondary particles) in a region farther from the cathode current collector 21A, as shown in FIG. 3.

More specifically, the cathode active material layer 21B may include, for example, a lower layer 21B1 (with a thickness T1) that includes the spherical active materials 211, and may include an upper layer 21B2 (with a thickness T2) that includes the planar active materials 212. It is to be noted that the cathode active material layer 21B may have a multi-layered structure that is not limited to two layers but includes three or more layers. In other words, the lower layer 21B1 and the upper layer 21B2 each may be formed of multiple layers. Alternatively, one or more other layers may be laminated on the upper layer 21B2.

The lower layer 21B1 is located in a region closer to the cathode current collector 21A, and is adjacent to the cathode current collector 21A. The spherical active materials 211 included in the lower layer 21B1 are each an aggregate (secondary particle) of a plurality of primary particles, as described above. FIG. 3 omits illustration of the primary particles that configure the spherical active material 211. It is to be noted that the lower layer 21B1 may include other materials such as a cathode binder and a cathode conductive agent together with the spherical active materials 211, as described above.

The upper layer 21B2 is located in a region farther from the cathode current collector 21A, and is adjacent to the lower layer 21B1. The planar active materials 212 included in the upper layer 21B2 are each an aggregate (secondary particle 212Y) of a plurality of primary particles 212X, as described above. FIG. 2 illustrates an aggregating state of the primary particles 212X only for part of the planular active materials 212 for the sake of simplifying the drawings. The wording "planular" described above refers to a substantially elliptical shape that has a major axis in a direction along a surface of the cathode current collector 21A. The major axis of the planular shape is not necessarily parallel to the surface of the cathode current collector 21A. It is to be noted that the upper layer 21B2 may include other materials such as the cathode binder and the cathode conductive agent together with the planular active materials 212, as described above.

It is to be noted that an average particle diameter D1 of the primary particles of the spherical active materials 211 included in the lower layer 21B1 is larger than an average particle diameter D2 of the primary particles 212X of the planular active materials 212 included in the upper layer 21B2. The "average particle diameter" as described herein is a so-called median diameter (D50). The median diameter (D50) may be determined, for example, by measuring major diameters (μm) of a plurality of primary particles with the use of an observation image taken, for example, by a scanning electron microscope (SEM) or the like, and then calculating an average value of the major diameters.

One of the reasons that the cathode active material layer 21B has the above-described configuration is as follows. The primary particles that have a small particle diameter easily aggregate to form a secondary particle, and the secondary particle tends to be easily deformed by external force. When a cathode material that includes these primary particles with a small particle diameter is used, battery characteristics such as load characteristics are improved due to an increase in diffusion speed of lithium ions. However, a specific surface area of the cathode material is increased. Therefore, when the amount of the cathode binder is insufficient, the binding force between the cathode materials is insufficient, and adhesive characteristics of the cathode active material layer 21B with respect to the cathode current collector 21A is insufficient. In this case, when the cathode active material layer 21B is compression-molded in processes of manufacturing a secondary battery, the secondary particles are crushed due to an influence of force that extends in the direction along the surface of the cathode current collector 21A. Thus, the secondary particles are deformed to have a planular shape. Therefore, the cathode active material layer 21B easily exfoliates from the cathode current collector 21A. It is to be noted that it may be contemplated to increase the amount of the cathode binder so as to improve the adhesive characteristics of the cathode active material layer 21B with respect to the cathode current collector 21A, and thereby, to suppress exfoliation of the cathode active material layer 21B. However, when the content of the cathode active material is relatively decreased with respect to the content of the cathode binder, the excessive amount of cathode binder prevents diffusion of lithium ions, and the battery characteristics are lowered accordingly.

On the other hand, when a cathode material that includes primary particles with a large particle diameter is used, the battery characteristics are not allowed to be improved to reach the level same as those in the case of using the cathode material that includes the primary particles with a small particle diameter described above. However, the specific surface area of the cathode material is decreased, and therefore, the binding force between the cathode materials are secured even with a small amount of cathode binder. In addition thereto, the adhesive characteristics of the cathode active material layer 21B with respect to the cathode current collector 21A are secured. Also, the primary particles with a large particle diameter are difficult to be deformed by external force. Therefore, the primary particles with a large particle diameter are not easily crushed at the time of compression-molding of the cathode active material layer 21B. Hence, the adhesive characteristics between the cathode current collector 21A and the cathode active material layer 21B are secured even when a large amount of cathode binder is not used. Accordingly, the exfoliation of the cathode active material layer 21B is suppressed, and the lowering of the battery characteristics resulting from an excessive amount of cathode binder is also suppressed.

Taking into consideration the above-described matters, the cathode active material layer 21B that includes the lower layer 21B1 and the upper layer 21B2 provides advantages resulting from the above-described primary particles with a small particle diameter, and also provides advantages resulting from the primary particles with a large particle diameter. In other words, the spherical active material 211 that includes primary particles with a large particle diameter is present in the lower layer 21B1 that is located in a region closer to the cathode current collector 21A. In this case, the adhesive characteristics of the cathode active material layer 21B with respect to the cathode current collector 21A are secured even with a small amount of cathode binder by utilizing the properties of the spherical active material 211 that is difficult to be deformed. Therefore, exfoliation of the cathode active material layer 21B is suppressed. In addition thereto, the planular active material 212 that includes primary particles 212X with a small particle diameter is present in the upper layer 21B2 that is located in a region farther from the cathode current collector 21A. In this case, battery characteristics such as load characteristics are improved by utilizing the property of the planular active material 212 in which lithium ions are easily diffused. Accordingly, suppression of exfoliation of the cathode active material layer 21B and improvement in battery characteristics are both achieved.

The average particle diameter D1 of the primary particles in the spherical active materials 211 is not specifically limited as long as the average particle diameter D1 is larger than the average particle diameter D2 of the primary particles 212X in the planular active materials 212. However, in particular, it is preferable that the average particle diameter D1 satisfy 0.1 μm<D1<30 μm, since the spherical active material 211 is further less likely to be deformed. On the other hand, the average particle diameter D2 of the primary particles 212X in the planular active materials 212 is not specifically limited as long as the average particle diameter D2 is smaller than the average particle diameter D1 of the primary particles of the spherical active materials 211. However, in particular, it is preferable that the average particle diameter D2 satisfy 0.01 μm<D2<1 μm), since diffusion characteristics of lithium ions are further improved.

Here, attention is focused on an average degree of circularity in order to define a shape of the cathode material. The "average degree of circularity" is an index that shows how close the shape defined by a contour of the cathode material is to a true circle that has an area same as that of the shape. In other words, the shape of the cathode material becomes closer to a true circle (spherical shape) as the average degree of circularity thereof becomes larger. The shape of the cathode material becomes farther from a true circle, namely, becomes a planular shape, as the average degree of circularity thereof becomes smaller. The average degree of circularity may be calculated, for example, with the use of image analysis software such as "ImageJ" available from National Institutes of Health (NIH), Bethesda, Md., USA.

An appearance shape of the spherical active material 211, out of the spherical active material 211 and the planular active material 212, is closer to a true circle. Therefore, an average degree of circularity C1 of the spherical active materials 211 is larger than an average degree of circularity C2 of the planular active materials 212.

The average degree of circularity C1 of the spherical active materials 211 is not specifically limited as long as the average degree of circularity C1 is larger than the average degree of circularity C2 of the planular active materials 212. However, to give an example, it is preferable that the average degree of circularity C1 be 0.6 or higher, since the spherical active material 211 becomes more difficult to be deformed. On the other hand, the average degree of circularity C2 of the planular active materials 212 is not specifically limited as long as the average degree of circularity C2 is smaller than the average degree of circularity C1 of the spherical active materials 211. However, in particular, it is preferable that the average degree of circularity C2 be 0.2 or lower, since diffusion characteristics of lithium ions are further improved.

It is to be noted that the thickness T1 of the lower layer 21B1 that includes the spherical active material 211 is preferably smaller than the thickness T2 of the upper layer 21B2 that includes the planular active material 212. One reason for this is that, as described above, out of the cathode active material layer 21B, a portion that substantially contributes to battery characteristics is the upper layer 21B2 that includes the primary particles 212X with a small particle diameter. Therefore, the battery characteristics are more improved as the thickness T2 is relatively larger than the thickness T1.

The cathode material that configures the spherical active material 211 and the planular active material 212 is preferably a lithium-containing compound, since a high energy density is thereby obtained. Examples of the lithium-containing compound include lithium composite oxides that include lithium and a transition metal element as constituent elements, and lithium phosphate compounds that include lithium and a transition metal element as constituent elements. Specifically, the transition metal element preferably includes one or more elements such as cobalt, nickel, manganese, and iron, since higher voltage is thereby obtained.

In particular, one or both of the cathode materials that configures the spherical active material 211 and that configures the planular active material 212 may include, for example, one or more of compounds represented by the following Formula (1) to Formula (5):

  (1)

where M1 includes one or more of Mg, Al, and Ba, and a satisfies $0<a\le1$;

  (2)

where M2 includes one or more of Mg, Al, Mn, and Ba, and b to d satisfy $0\le b<0.1$ and $0<c+d<1$;

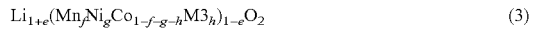  (3)

where M3 includes one or more of Mg, Al, Zn, Ti, and V, and e to h satisfy $0.05\le e<0.25$, $0.5\le f<0.7$, $0\le g<(1-f)$, and $0.001\le h<0.05$;

  (4)

where M4 includes one or more of Fe, Mn, and Co; and

  (5)

where M5 includes one or more of Co, Ni, Mg, Al, B, Ti, V, Cr, Fe, Cu, Zn, Mo, Sn, Ca, Sr, and W, and i to k and m satisfy $0.9\le i\le1.1$, $0\le j\le0.6$, $3.7\le k\le4.1$, and $0\le m\le0.1$.

The compounds represented by Formula (1) to Formula (3) are each a lithium composite oxide that has a bedded salt type crystal structure. In detail, the compound represented by Formula (1) is a cobalt-based lithium composite oxide such as LiCoO$_2$ and LiCo$_{0.98}$Al$_{0.01}$Mg$_{0.01}$O$_2$. The compound represented by Formula (2) is a nickel-cobalt-based lithium composite oxide such as Li$_{1.03}$Ni$_{0.77}$Co$_{0.20}$Al$_{0.03}$O$_2$. The compound represented by Formula (3) is a manganese-nickel-cobalt-based lithium composite oxide such as Li$_{1.13}$(Mn$_{0.6}$Ni$_{0.2}$CO$_{0.2}$)$_{0.87}$Al$_{0.01}$O$_2$. The compound represented by Formula (4) is a lithium phosphate compound that has an olivine crystal structure such as LiFePO$_4$, LiMnPO$_4$, and LiFe$_{0.5}$Mn$_{0.5}$PO$_4$. The compound represented by Formula (5) is a lithium composite oxide that has a spinel crystal structure such as LiMn$_2$O$_4$. It is to be noted that a value of "i" in Formula (5) is a value in a fully-discharged state.

The lower layer 21B1 may include only one type of cathode material, or may include two or more types of cathode materials, as the spherical active material 211. The same is applicable to the planular active material 212 in the upper layer 21B2. Further, the cathode material of the spherical active material 211 and the cathode material of the planular active material 212 may be the same, or may be different from each other. When the spherical active material 211 and the planular active material 212 each include two or more types of cathode materials, part of the cathode materials may be the same.

It is to be noted that the cathode active material layer 21B may include, as the cathode active material, other cathode materials in addition to the above-described cathode material. Examples of the above-mentioned "other cathode materials" include oxides, disulfides, calcogenides, and electrically-conductive polymers. Examples of the oxides include titanium oxide, vanadium oxide, and manganese dioxide. Examples of the disulfides include titanium disulfide and molybdenum sulfide. Examples of the calcogenides include niobium selenide. Examples of the electrically-conductive polymer include sulfur, polyaniline, and polythiophene.

The cathode binder may include, for example, one or more of synthetic rubbers and polymer materials. Examples of the synthetic rubbers include styrene-butadiene-based rubber, fluorine-based rubber, and ethylene propylene diene. Examples of the polymer materials include polyvinylidene fluoride and polyimide.

The content of the cathode binder in the cathode active material layer 21B is not specifically limited. However, specifically, it is preferable that the content of the cathode binder be set properly for each layer to obtain the above-described advantages related to the lower layer 21B1 and the upper layer 21B2.

In particular, when the lower layer 21B1 that includes the spherical active material 211 includes the cathode binder, a ratio W1 of the content of the cathode binder with respect to a content of a total solid (the spherical active materials 211 and the cathode binder) in the lower layer 21B1 preferably satisfies 0.5 weight %<W1<5 weight %. One reason is that this further improves the adhesive characteristics of the cathode active material layer 21B with respect to the cathode current collector 21A. The ratio W1 is calculated with an expression W1 (weight %)=(weight of cathode binder/weight of spherical active materials 211)×100. It is to be noted that, when the lower layer 21B1 further includes other solid materials such as a cathode conductive agent, the solid materials such as the cathode conductive agent are also included in the "total solid".

Further, when the upper layer 21B2 that includes the planular active material 212 includes the cathode binder, a ratio W2 of the content of the cathode binder with respect to a content of a total solid (the planular active materials 212 and the cathode binder) in the upper layer 21B2 preferably satisfies 2 weight %<W2<10 weight %. One reason is that this further improves the diffusion characteristics of lithium ions. The ratio W2 is calculated with an expression W2 (weight %)= (weight of cathode binder/weight of planular active materials 212)×100. It is to be noted that, when the upper layer 21B2 further includes other solid materials such as a cathode conductive agent, the solid materials such as the cathode conductive agent are also included in the "total solid".

It is to be noted that the magnitude relationship between the ratios W1 and W2 is not specifically limited. However, in particular, it is preferable that W1 be smaller than W2, since the adhesive characteristics of the cathode active material layer 21B with respect to the cathode current collector 21A are further increased and diffusion characteristics of lithium ions are further improved.

The cathode conductive agent may be, for example, one or more of materials such as carbon materials. Examples of the carbon materials include graphite, carbon black, acetylene black, and Ketjen black (registered trademark). It is to be noted that the cathode conductive agent may be metal materials or electrically-conductive polymers as long as the cathode conductive agent is a material with electrical conductivity.

[Anode]

The anode 22 may be configured of, for example, an anode current collector 22A and an anode active material layer 22B that is provided on one or both surfaces of the anode current collector 22A.

The anode current collector 22A may be formed of, for example, an electrically-conductive material such as copper, nickel, and stainless steel. The surface of the anode current collector 22A is preferably roughened, since adhesive characteristics of the anode active material layer 22B with respect to the anode current collector 22A is improved due to a so-called anchor effect. In this case, it may be good enough that the surface of the anode current collector 22A in the region opposed to the anode active material layer 22B is roughened at least. Examples of roughening methods include a method of forming fine particles by electrolytic treatment. The electrolytic treatment is a method of providing asperity by forming fine particles on the surface of the anode current collector 22A by an electrolytic method in an electrolytic bath. A copper foil formed by the electrolytic method is generally called "electrolytic copper foil".

The anode active material layer 22B includes, as an anode active material, one or more of anode materials that are capable of inserting and extracting lithium ions. The anode active material layer 22B may further include other materials such as an anode binder and an anode conductive agent. It is to be noted that the details of the anode binder and the anode conductive agent may be, for example, similar to those of the cathode binder and the cathode conductive agent, respectively. The anode active material layer 22B preferably has, for example, a chargeable capacity of the anode material that is larger than a discharge capacity of the cathode 21, so as to prevent unintentional precipitation of lithium metal at the time of charge and discharge.

The anode material may be, for example, a carbon material. One reason for this is that, in the carbon material, its crystal structure changes at the time of insertion and extraction of lithium ions is extremely small, and therefore, the carbon material provides high energy density and superior cycle characteristics. Another reason is that the carbon material also functions as an anode conductive agent. Examples of the carbon material include graphitizable carbon, non-graphitizable carbon in which the spacing of (002) plane is equal to or greater than 0.37 nm, and graphite in which the spacing of (002) plane is equal to or smaller than 0.34 nm. More specifically, examples of the carbon material include pyrolytic carbons, cokes, glassy carbon fiber, an organic polymer compound fired body, activated carbon, and carbon blacks. Of the foregoing, examples of the cokes include pitch coke, needle coke, and petroleum coke. The organic polymer compound fired body is a material in which a polymer compound such as phenol resin and furan resin is fired (carbonized) at appropriate temperature. In addition to the above-mentioned materials, the carbon material may be low crystalline carbon or amorphous carbon that are heat-treated at temperature equal to or lower than about 1000° C. It is to be noted that the shape of the carbon material may be any of a fibrous shape, a spherical shape, a granular shape, and a scale-like shape.

Further, the anode material may be, for example, a material (metal-based material) that includes one or more of metal elements and metalloid elements as constituent elements, since high energy density is thereby obtained. The metal-based material may be a simple substance, an alloy, or a compound, may be two or more thereof, or may have one or more phases thereof in part or all of the material. It is to be noted that "alloy" includes a material that includes one or more metal elements and one or more metalloid elements, in addition to a material configured of two or more metal elements. Further, "alloy" may contain a nonmetallic element. Example of a texture thereof include a solid solution, a eutectic crystal (eutectic mixture), an intermetallic compound, and a texture in which two or more thereof coexist.

The above-described metal element and metalloid element may be, for example, one or more of metal elements and metalloid elements that are capable of forming an alloy with lithium. Specific examples thereof include Mg, B, Al, Ga, In, Si, Ge, Sn, Pb, Bi, Cd, Ag, Zn, Hf, Zr, Y, Pd, and Pt. Specifically, one or both of Si and Sn are preferable, since Si and Sn have a high ability of inserting and extracting lithium ions, and therefore provide high energy density.

A material that includes one or both of Si and Sn may be a simple substance, an alloy, or a compound of Si or Sn; two or more thereof; or a material that has one or more phases thereof in part or all of the material. It is to be noted that the "simple substance" merely refers to a simple substance in a general sense (a small amount of impurity may be contained therein), and does not necessarily refer to a simple substance of a 100% purity.

The alloy of Si may be, for example, a material that includes one or more of elements such as Sn, Ni, Cu, Fe, Co, Mn, Zn, In, Ag, Ti, Ge, Bi, Sb, and Cr as constituent elements other than Si. The compounds of Si may be, for example, a material that includes C or O as a constituent element other than Si. It is to be noted that the compound of Si may include one or more of the elements described for the alloys of Si as constituent elements other than Si.

Examples of the alloys and the compounds of Si include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and $LiSiO$. It is to be noted that v in $SiO_v$ may be in the range of $0.2<v<1.4$.

Examples of the alloys of Sn include a material that includes one or more of elements such as Si, Ni, Cu, Fe, Co, Mn, Zn, In, Ag, Ti, Ge, Bi, Sb, and Cr as constituent elements other than Sn. Examples of the compounds of Sn include a material that includes C or O as a constituent element. It is to be noted that the compounds of Sn may contain, for example, one or more of the elements described for the alloys of Sn as constituent elements other than Sn. Examples of the alloys and the compounds of Sn include $SnO_w$ ($0<w\leq2$), $SnSiO_3$, $LiSnO$, and $Mg_2Sn$.

Further, as a material that includes Sn, for example, a material that includes Sn as a first constituent element and includes a second constituent element and a third constituent element in addition thereto is preferable. The second constituent element may be, for example, one or more of elements such as Co, Fe, Mg, Ti, V, Cr, Mn, Ni, Cu, Zn, Ga, Zr, Nb, Mo, Ag, In, Ce, Hf, Ta, W, Bi, and Si. The third constituent element may be, for example, one or more of elements such as B, C, Al, and P. When the material that includes Sn includes the second and third constituent elements, for example, a high battery capacity, superior cycle characteristics, and the like are obtained.

Specifically, the material that includes Sn is preferably a material that includes Sn, Co, and C (SnCoC-containing material). Concerning the composition of the SnCoC-containing material, for example, the C content may be from 9.9 mass % to 29.7 mass % both inclusive, and the ratio of Sn and Co contents (Co/(Sn+Co)) may be from 20 mass % to 70 mass % both inclusive, since such a composition range provides high energy density.

The SnCoC-containing material includes a phase that includes Sn, Co, and C. The phase is preferably low-crystalline or amorphous. The phase is a reactive phase capable of reacting with lithium, and favorable characteristics are obtained by the presence of the phase. The half bandwidth of a diffraction peak of the phase obtained by X-ray diffraction is preferably 1° or larger at a diffraction angle of 2θ in the case where a CuKα ray is used as a specific X ray and the sweep rate is 1°/min. One reason is that this allows lithium ions to be inserted and extracted more smoothly, and reduces reactivity with an electrolytic solution. It is to be noted that the SnCoC-containing material may include a phase that includes the simple substance of each constituent element or a part of the constituent element in addition to a low crystalline phase or an amorphous phase.

Whether or not the diffraction peak obtained by X-ray diffraction corresponds to a reactive phase capable of reacting with lithium is easily determined by comparing X-ray diffraction charts before and after electrochemical reaction with lithium. For example, when the position of the diffraction peak before the electrochemical reaction with lithium is different from that after the electrochemical reaction, the diffraction peak corresponds to a reactive phase capable of reacting with lithium. In this case, for example, the diffraction peak of a low-crystalline reactive phase or an amorphous reactive phase may be detected within a range of 2θ=20° to 50°. Such a reactive phase may include, for example, the above-described constituent elements, and is considered to be changed to be low-crystalline or amorphous mainly due to the presence of carbon.

In the SnCoC-containing material, part or all of carbon as a constituent element is preferably bonded to a metal element or a metalloid element as another constituent element, since aggregation and crystallization of, for example, tin and the like is suppressed. The bonding state of elements may be determined by, for example, X-ray photoelectron spectroscopy (XPS). In a commercially-available apparatus, for example, an Al-Kα ray or an Mg-Kα ray may be used as a soft X ray. In the case where part or all of carbon is bonded to an element such as a metal element and a metalloid element, the peak of a composite wave of the 1s orbit (C1s) of C is observed in a region lower than 284.5 eV. It is to be noted that energy calibration is performed so as to allow the peak of the 4f orbit (Au4f) of a gold atom to be obtained at 84.0 eV. In this case, typically, since surface contamination carbon is present on a material surface, the peak of C1s of the surface contamination carbon is defined at 284.8 eV, and is used as energy reference. In XPS measurement, the waveform of the peak of C1s is obtained in a form that includes the peak of the surface contamination carbon and the peak of carbon in the SnCoC-containing material. Therefore, the peak of the surface contamination carbon and the peak of carbon in the SnCoC-containing material are separated, for example, by analysis with the use of commercially-available software. In the analysis of the waveform, the position of a main peak that is in a region closer to a lowest binding energy is used as the energy reference (284.8 eV).

It is to be noted that the SnCoC-containing material may further include, for example, one or more of elements such as Si, Fe, Ni, Cr, In, Nb, Ge, Ti, Mo, Al, P, Ga, and Bi.

In addition to the SnCoC-containing material, a material that includes Sn, Co, Fe, and C (SnCoFeC-containing material) is also preferable. The composition of the SnCoFeC-containing material may be optionally set. For example, in the composition in which the Fe content is set small, the C content may be from 9.9 mass % to 29.7 mass % both inclusive, the Fe content may be from 0.3 mass % to 5.9 mass % both inclusive, and the ratio of contents of Sn and Co (Co/(Sn+Co)) may be from 30 mass % to 70 mass % both inclusive. Further, for example, in the composition in which the Fe content is set large, the C content may be from 11.9 mass % to 29.7 mass % both inclusive, the ratio of contents of Sn, Co, and Fe ((Co+Fe)/(Sn+Co+Fe)) may be from 26.4 mass % to 48.5 mass % both inclusive, and the ratio of contents of Co and Fe (Co/(Co+Fe)) may be from 9.9 mass % to 79.5 mass % both inclusive. One reason is that, in such a composition range, high energy density is obtained. The physical properties (such as half bandwidth) of the SnCoFeC-containing material are similar to those of the above-described SnCoC-containing material.

In addition to the above-mentioned materials, the anode material may be, for example, a metal oxide, a polymer compound, or the like. Examples of the metal oxide include iron oxide, ruthenium oxide, and molybdenum oxide. Examples of the polymer compound include polyacetylene, polyaniline, and polypyrrole.

The anode active material layer 22B may be formed by, for example, a coating method, a vapor-phase method, a liquid-phase method, a spraying method, a firing method (sintering method), or a combination of two or more of these methods. The coating method may be, for example, a method in which, after a particulate anode active material is mixed with materials such as an anode binder, the mixture is dispersed in a solvent such as an organic solvent, and the anode current collector is coated with the resultant. Examples of the vapor-phase method include a physical deposition method and a chemical deposition method. Specifically, examples thereof include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase method include an electrolytic plating method and an electroless plating method. The spraying method may be, for example, a method in which an anode active material in a fused state or a semi-fused state is sprayed. The firing method may be, for example, a method in which, after the anode current collector is coated by a coating method, heat treatment is performed at temperature higher than the melting point of the materials such as the anode binder. As the firing method, a known technique may be used. Examples of such methods include an atmosphere firing method, a reactive firing method, and a hot press firing method.

In the secondary battery, as described above, in order to prevent unintentional precipitation of lithium metal on the anode 22 in the middle of charge, the electrochemical equivalent of the anode material capable of inserting and extracting lithium ions is larger than the electrochemical equivalent of the cathode. Further, when the open circuit voltage (that is, a battery voltage) at the time of completely-charged state is equal to or greater than 4.25 V, the extraction amount of lithium ions per unit mass is larger than that in the case where the open circuit voltage is 4.20 V even if the same cathode active material is used. Therefore, amounts of the cathode active material and the anode active material are adjusted in accordance therewith. Thus, high energy density is obtained.

[Separator]

The separator 23 separates the cathode 21 from the anode 22, and passes lithium ions while preventing current short circuit resulting from contact of both electrodes. The separator 23 may be, for example, a porous film made of a synthetic resin or ceramics. The separator 23 may be a laminated film in which two or more porous films are laminated. Examples of the synthetic resin include polytetrafluoroethylene, polypropylene, and polyethylene.

In particular, the separator 23 may include, for example, a base material layer that is made of the above-described porous film, and a polymer compound layer that is provided on one or both surfaces of the base material layer. One reason is that this improves adhesive characteristics of the separator 23 with respect to the cathode 21 and the anode 22, and therefore, suppresses distortion of the spirally wound electrode body 20. Hence, a decomposition reaction of the electrolytic solution is suppressed, and liquid leakage of the electrolytic solution with which the base material layer is impregnated is suppressed. Accordingly, even if charge and discharge are repeated, the resistance of the secondary battery is less likely to be increased, and battery swollenness is suppressed.

The polymer compound layer may include, for example, a polymer material such as polyvinylidene fluoride, since such a polymer material has a superior physical strength and is electrochemically stable. However, the polymer material may be a material other than polyvinylidene fluoride. The polymer compound layer may be formed, for example, by preparing a solution in which the polymer material is dissolved, then coating the surface of the base material layer with the solution, and drying the resultant. It is to be noted that, the base material layer may be soaked in the solution and be subsequently dried.

[Electrolytic Solution]

The separator 23 is impregnated with an electrolytic solution that is a liquid electrolyte. The electrolytic solution includes a solvent and an electrolyte salt, and may further include other materials such as an additive.

[Solvent]

The solvent includes one or more of non-aqueous solvents such as organic solvents.

Examples of the non-aqueous solvents include ethylene carbonate, propylene carbonate, butylene carbonate, dimethyl carbonate, diethyl carbonate, ethyl methyl carbonate, methylpropyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. The above-described materials provide, for example, superior battery capacity, superior cycle characteristics, superior conservation characteristics, and the like.

Specifically, the solvent is preferably one or more of ethylene carbonate, propylene carbonate, dimethyl carbonate, diethyl carbonate, and ethyl methyl carbonate, since, for example, a superior battery capacity, superior cycle characteristics, superior conservation characteristics, and the like are thereby obtained. In this case, a combination of a high viscosity (high dielectric constant) solvent (for example, specific dielectric constant $\epsilon \geq 30$) such as ethylene carbonate and propylene carbonate and a low viscosity solvent (for example, viscosity$\leq 1$ mPa·s) such as dimethyl carbonate, ethylmethyl carbonate, and diethyl carbonate is more preferable. One reason is that this improves the dissociation properties of the electrolyte salt and ion mobility.

In particular, the solvent preferably includes one or more of unsaturated cyclic ester carbonates. One reason is that this forms a stable protective film on the surface of the anode 22 mainly at the time of charge and discharge, and therefore, suppresses a decomposition reaction of the electrolytic solution. The "unsaturated cyclic ester carbonate" refers to a cyclic ester carbonate that has one or more unsaturated carbon bonds (carbon-carbon double bonds). Specific examples of the unsaturated cyclic ester carbonate include vinylene carbonate, vinylethylene carbonate, and methylene ethylene carbonate. The content of the unsaturated cyclic ester carbonate in the solvent is not particularly limited. To give an example, the content thereof may be, for example, from 0.01 wt % to 10 wt % both inclusive. It is to be noted that specific examples of the unsaturated cyclic ester carbonate are not limited to the compounds described below, and may be other compounds.

Further, the solvent preferably includes one or more of halogenated ester carbonates. One reason is that this forms a stable protective film mainly on the surface of the anode 22 at the time of charge and discharge, and therefore, suppresses a decomposition reaction of the electrolytic solution. The halogenated ester carbonate is a cyclic or chain ester carbonate that includes one or more halogens as constituent elements. Examples of the cyclic halogenated ester carbonate include 4-fluoro-1,3-dioxolane-2-one and 4,5-difluoro-1,3-dioxolane-2-one. Examples of the chain halogenated ester carbonate include fluoromethyl methyl carbonate, bis(fluoromethyl) carbonate, and difluoromethyl methyl carbonate. Although the content of the halogenated ester carbonate in the solvent is not particularly limited, the content thereof may be, for example, from 0.01 wt % to 50 wt % both inclusive. It is to be noted that specific examples of the halogenated ester carbonate are not limited to the compounds described above, and may be other compounds.

Further, the solvent preferably includes sultone (cyclic sulfonic ester), since the chemical stability of the electrolytic solution is thereby further improved. Examples of the sultone include propane sultone and propene sultone. Although the content of sultone in the solvent is not particularly limited, the sultone content may be, for example, from 0.5 wt % to 5 wt % both inclusive. It is to be noted that specific examples of sultone are not limited to the above-described compounds, and may be other compounds.

Further, the solvent preferably includes an acid anhydride since the chemical stability of the electrolytic solution is thereby further improved. Examples of the acid anhydrides include carboxylic anhydride, disulfonic anhydride, and carboxylic acid sulfonic acid anhydride. Examples of the carboxylic anhydride include succinic anhydride, glutaric anhydride, and maleic anhydride. Examples of the disulfonic anhydride include ethane disulfonic anhydride and propane disulfonic anhydride. Examples of the carboxylic acid sulfonic acid sulfonic acid anhydride include sulfobenzoic anhydride, sulfopropionic anhydride, and sulfobutyric anhydride. Although the content of the acid anhydride in the solvent is not particularly limited, the content thereof may be, for example, from 0.5 wt % to 5 wt % both inclusive. However, specific examples of the acid anhydrides are not limited to the above-described compounds, and may be other compounds.

[Electrolyte Salt]

The electrolyte salt may include, for example, one or more of lithium salts that will be described below. However, the electrolyte salt may include a salt other than a lithium salt (such as a light metal salt other than lithium salts).

Examples of the lithium salts include compounds such as $LiPF_6$, $LiBF_4$, $LiClO_4$, $LiAsF_6$, $LiB(C_6H_5)_4$, $LiCH_3SO_3$, $LiCF_3SO_3$, $LiAlCl_4$, $Li_2SiF_6$, $LiCl$, and $LiBr$. One reason is that this provides, for example, a superior battery capacity, superior cycle characteristics, superior conservation characteristics, and the like.

Specially, one or more of $LiPF_6$, $LiBF_4$, $LiClO_4$, and $LiAsF_6$ are preferable, and $LiPF_6$ is more preferable, since the internal resistance is thereby lowered, and therefore, a higher effect is obtained.

The content of the electrolyte salt is preferably from 0.3 mol/kg to 3.0 mol/kg both inclusive with respect to the solvent, since high ion conductivity is thereby obtained.

[Operation of Secondary Battery]

In the secondary battery, for example, lithium ions extracted from the cathode 21 may be inserted in the anode 22 through the electrolytic solution at the time of charge, and lithium ions extracted from the anode 22 may be inserted in the cathode 21 through the electrolytic solution at the time of discharge.

[Method of Manufacturing Secondary Battery]

The secondary battery may be manufactured, for example, by the following procedure.

First, the cathode 21 is fabricated. A cathode active material is mixed with, for example, a cathode binder, a cathode conductive agent, and the like to prepare a cathode mixture. Subsequently, the cathode mixture is dispersed, for example, in an organic solvent or the like to obtain paste cathode mixture slurry. Subsequently, both surfaces of the cathode current collector 21A are coated with the cathode mixture slurry, and the resultant is dried. Thus, the lower layer 21B1 that includes the spherical active material 211 is formed. Subsequently, the upper layer 21B2 that includes the planular active material 212 is formed by a procedure similar to that of the lower layer 21B1. Thus, the cathode active material layer 21B that includes the lower layer 21B1 and the upper layer 21B2 is formed. Subsequently, the cathode active material layer 21B is compression-molded with the use of, for example, a roll pressing machine and/or the like while being heated where appropriate. In this case, compression-molding may be repeated several times. It is to be noted that the lower layer 21B1 may be formed and compression-molded, and then the upper layer 21B2 may be formed and compression-molded.

Further, the anode 22 is fabricated by a procedure similar to that of the cathode 21 described above. An anode mixture in which an anode active material is mixed with, for example, an anode binder, an anode conductive agent, and the like is dispersed, for example, in an organic solvent or the like to form paste anode mixture slurry. Subsequently, both surfaces of the anode current collector 22A are coated with the anode mixture slurry, and the resultant is dried. Thus, the anode active material layer 22B is formed. After that, the anode active material layer 22B is compression-molded where appropriate.

Further, the electrolyte salt is dispersed in the solvent to prepare the electrolytic solution.

Finally, the secondary battery is assembled with the cathode 21 and the anode 22. First, the cathode lead 25 is attached to the cathode current collector 21A and the anode lead 26 is attached to the anode current collector 22A, for example, by a welding method and/or the like. Subsequently, the cathode 21 and the anode 22 are laminated with the separator 23 in between and are spirally wound. Thus, the spirally wound electrode body 20 is fabricated. Thereafter, the center pin 24 is inserted in the center of the spirally wound electrode body 20. Subsequently, the spirally wound electrode body 20 is sandwiched between the pair of insulating plates 12 and 13, and is contained in the battery can 11. In this case, the end tip of the cathode lead 25 is attached to the safety valve mechanism 15 and the end tip of the anode lead 26 is attached to the battery can 11, for example, by a welding method and/or the like. Subsequently, the electrolytic solution is injected into the battery can 11, and the separator 23 is impregnated with the electrolytic solution. Subsequently, the battery cover 14, the safety valve mechanism 15, and the PTC device 16 are fixed by being swaged with the gasket 17 at the open end of the battery can 11.

[Functions and Effects of Secondary Battery]

According to the cylindrical type secondary battery, in the cathode active material layer 21B, the average particle diameter D1 of the primary particles of the spherical active materials 211 that are included in the lower layer 21B1 is larger than the average particle diameter D2 of the primary particles 212X of the planular active materials 212 that are included in the upper layer 21B2. In this case, as described above, in the lower 21B1 that includes the spherical active material 211 with a large particle diameter, the adhesive characteristics of the cathode active material layer 21B with respect to the cathode current collector 21A are secured even when the cathode active material layer 21B is compression-molded in the process of manufacturing the secondary battery. In addition thereto, in the upper layer 21B2 that includes the planular active material 212 with a small particle diameter, battery characteristics such as load characteristics are improved. Accordingly, both suppression of exfoliation of the active material layer 21B and improvement in battery characteristics are achieved.

Specifically, a further higher effect is obtained when the average degree of circularity C1 of the spherical active materials 211 is higher than the average degree of circularity C2 of the planular active materials 212, more specifically, when the average degree of circularity C1 is 0.6 or higher and the average degree of circularity C2 is 0.2 or lower.

Further, a further higher effect is obtained when the average particle diameter D1 of the primary particles of the spherical active materials 211 satisfies 0.1 μm<D1<30 μm, and the average particle diameter D2 of the primary particles 211X of the planular active materials 212 satisfies 0.01 μm<D2<1 μm.

Further, battery characteristics are further improved when the thickness T1 of the lower layer 21B1 that includes the spherical active material 211 is smaller than the thickness T2 of the upper layer 21B2 that includes the planular active material 212.

[1-2. Lithium Ion Secondary Battery (Laminated Film Type)]

Figure 4:
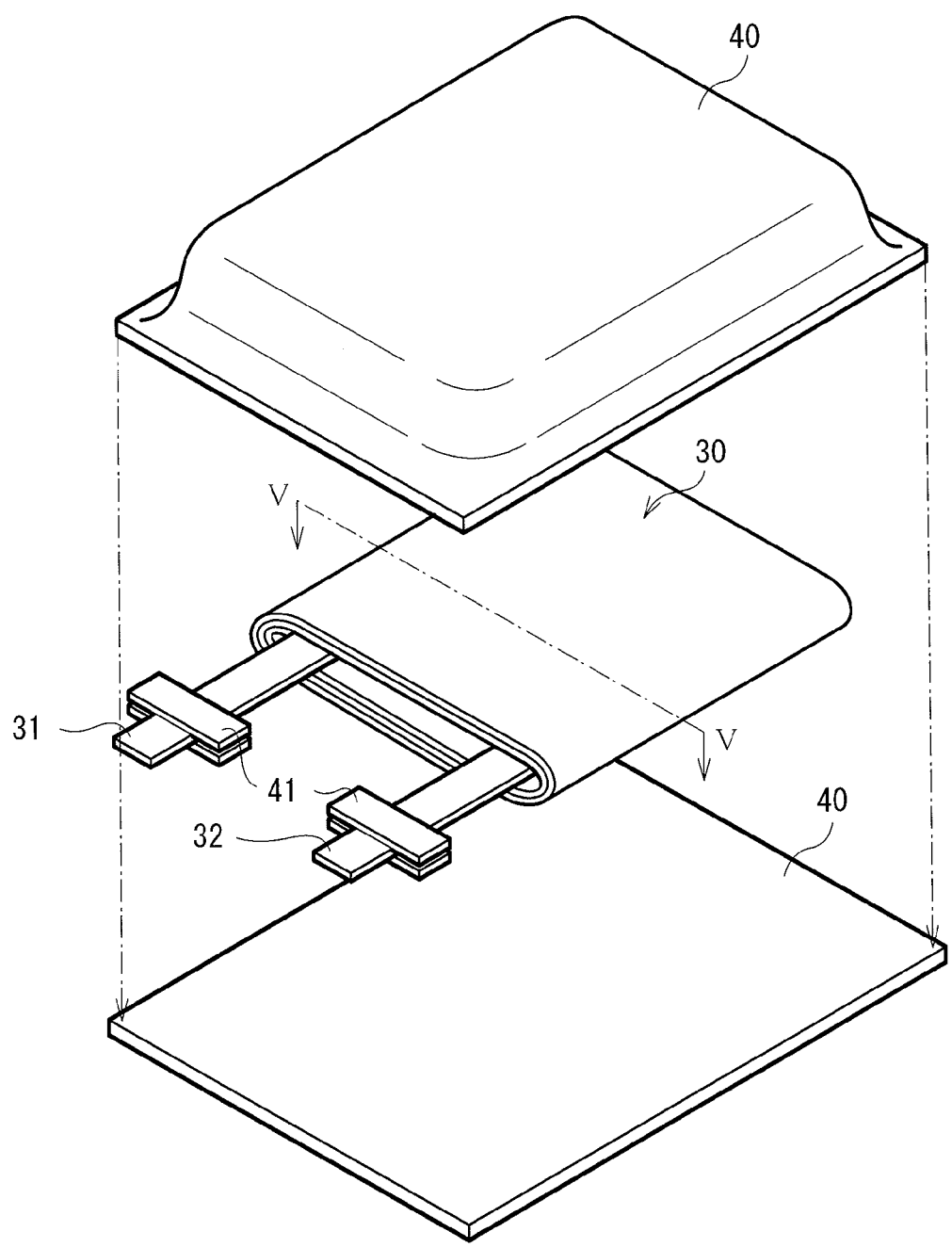
FIG. 4 is a perspective view illustrating a configuration of another secondary battery (laminated film type) that includes an electrode according to an embodiment of the present application.
Figure 5:
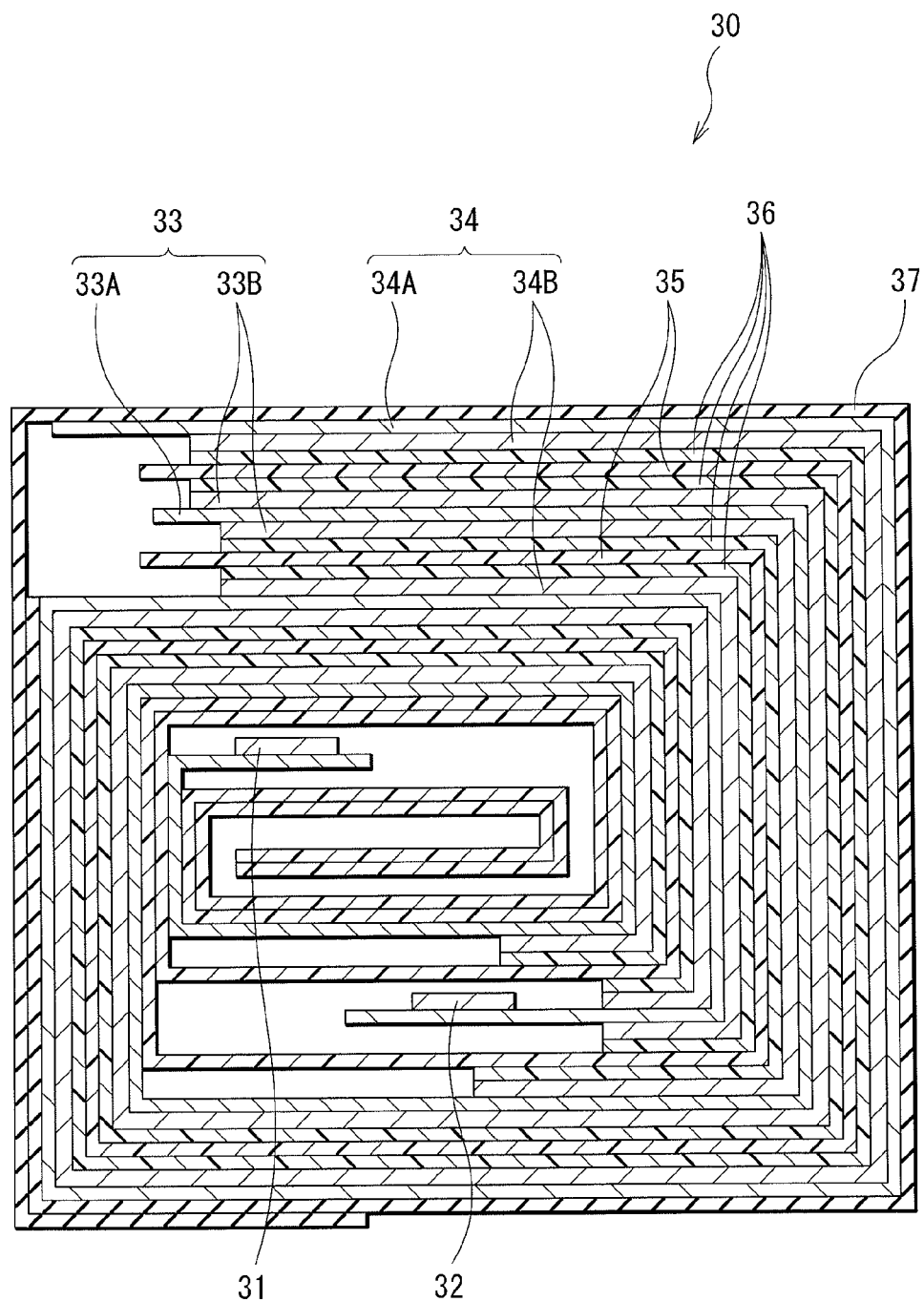
FIG. 5 is a cross-sectional view of the spirally wound electrode body shown in FIG. 4, taken along a line V-V.

FIG. 4 illustrates an exploded perspective configuration of another secondary battery that uses an electrode according to an embodiment of the present application. FIG. 5 illustrates an enlarged cross section taken along a line V-V of a spirally wound electrode body 30 illustrated in FIG. 4. In this example, for example, the electrode according to the embodiment described above of the present application is used as a cathode 33, and the elements of the cylindrical type secondary battery described above will be used as necessary in the following description.

[General Configuration of Secondary Battery]

The secondary battery is a so-called laminated film type lithium ion secondary battery. In the secondary battery, the spirally wound electrode body 30 is contained in a film-like outer package member 40. The spirally wound electrode body 30 includes the cathode 33 and an anode 34 that are laminated with a separator 35 and an electrolyte layer 36 in between, and are spirally wound. A cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 may be, for example, led out from inside to outside of the outer package member 40 in the same direction. The cathode lead 31 may be formed of, for example, an electrically-conductive material such as aluminum, and the anode lead 32 may be formed of, for example, an electrically-conducive material such as copper, nickel, and stainless steel. These electrically-conductive materials may be in the shape of, for example, a thin plate or mesh.

The outer package member 40 may be, for example, a laminated film in which a fusion bonding layer, a metal layer, and a surface protective layer are laminated in this order. In the laminated film, for example, the respective outer edges of the fusion bonding layers of two films are bonded to each other, for example, by fusion bonding, an adhesive, or the like so that the fusion bonding layers face the spirally wound electrode body 30. Examples of the fusion bonding layer include a film made of a material such as polyethylene and polypropylene. Examples of the metal layer include an aluminum foil. Examples of the surface protective layer include a film made of a material such as nylon and polyethylene terephthalate.

Specially, as the outer package member 40, an aluminum laminated film in which a polyethylene film, an aluminum foil, and a nylon film are laminated in this order is preferable. However, the outer package member 40 may be a laminated film that has other laminated structures, a polymer film such as a polypropylene film, or a metal film.

An adhesion film 41 is inserted between the outer package member 40 and the cathode lead 31 and between the outer package member 40 and the anode lead 32 to prevent outside air intrusion. The adhesion film 41 is formed of a material that has adhesion characteristics with respect to the cathode lead 31 and the anode lead 32. Examples of such a material include a polyolefin resin such as polyethylene, polypropylene, modified polyethylene, and modified polypropylene.

The cathode 33 may include, for example, a cathode current collector 33A and a cathode active material layer 33B that is provided on both surfaces of the cathode current collector 33A. The anode 34 may include, for example, an anode current collector 34A and an anode active material layer 34B that is provided on both surfaces of the anode current collector 34A. The configurations of the cathode current collector 33A, the cathode active material layer 33B, the anode current collector 34A, and the anode active material layer 34B are similar to those of the cathode current collector 21A, the cathode active material layer 21B, the anode current collector 22A, and the anode active material layer 22B, respectively. Further, the configuration of the separator 35 is similar to that of the separator 23.

In other words, the cathode active material layer 33B includes the lower layer that is located in a region closer to the cathode current collector 33A and includes the spherical active material, and the upper layer that is located in a region farther from the cathode current collector 33A and includes the planular active material. Further, the average particle diameter (D50) of primary particles of the spherical active material is larger than the average particle diameter (D50) of primary particles of the planular active material.

The electrolyte layer 36 includes an electrolytic solution that is held by a polymer compound, and is a so-called gel electrolyte. One reason is that this provides high ion conductivity (for example, 1 mS/cm or more at room temperature) and prevents liquid leakage of the electrolytic solution. The electrolyte layer 36 may further contain other materials such as an additive.

Examples of the polymer compound include one or more of polyacrylonitrile, polyvinylidene fluoride, p olytetrafluoro ethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, polycarbonate, and a copolymer of vinylidene fluoride and hexafluoro propylene. In particular, polyvinylidene fluoride or the copolymer of vinylidene fluoride and hexafluoro propylene is preferable, and polyvinylidene fluoride is more preferable, since such a polymer compound is electrochemically stable.

The composition of the electrolytic solution is similar to that of the cylindrical type secondary battery. However, in the electrolyte layer 36 that is a gel electrolyte, the solvent of the electrolytic solution refers to a broad concept that includes not only a liquid solvent but also a material that has ion conductivity capable of dissociating electrolyte salts. Therefore, when a polymer compound that has ion conductivity is used, the polymer compound is also encompassed in the solvent.

It is to be noted that the electrolytic solution may be used as it is instead of the gel electrolyte layer 36. In this case, the separator 35 is impregnated with the electrolytic solution.

[Operation of Secondary Battery]

In the secondary battery, for example, lithium ions extracted from the cathode 33 may be inserted in the anode 34 through the electrolyte layer 36 at the time of charge, and lithium ions extracted from the anode 34 may be inserted in the cathode 33 through the electrolyte layer 36 at the time of discharge.

[Method of Manufacturing Secondary Battery]

The secondary battery that includes the gel electrolyte layer 36 may be manufactured, for example, by the following three types of procedures.

In the first procedure, the cathode 33 and the anode 34 are fabricated by a fabrication procedure similar to that of the cathode 21 and the anode 22. In this case, the cathode 33 is fabricated by forming the cathode active material layer 33B on both surfaces of the cathode current collector 33A, and the anode 34 is fabricated by forming the anode active material layer 34B on both surfaces of the anode current collector 34A. Subsequently, a precursor solution that includes an electrolytic solution, a polymer compound, and a solvent such as an organic solvent is prepared. Thereafter, the cathode 33 and the anode 34 are coated with the precursor solution to form the gel electrolyte layer 36. Subsequently, the cathode lead 31 is attached to the cathode current collector 33A and the anode lead 32 is attached to the anode current collector 34A, for example, by a welding method and/or the like. Subsequently, the cathode 33 and the anode 34 provided with the electrolyte layer 36 are laminated with the separator 35 in between and are spirally wound to fabricate the spirally wound electrode body 30. Thereafter, the protective tape 37 is adhered to the outermost periphery thereof. Subsequently, after the spirally wound electrode body 30 is sandwiched between two pieces of film-like outer package members 40, the outer edges of the outer package members 40 are bonded, for example, by a thermal fusion bonding method and/or the like to enclose the spirally wound electrode body 30 in the outer package members 40. In this case, the adhesion films 41 are inserted between the cathode lead 31 and the outer package member 40 and between the anode lead 32 and the outer package member 40.

In the second procedure, the cathode lead 31 is attached to the cathode 33, and the anode lead 32 is attached to the anode 34. Subsequently, the cathode 33 and the anode 34 are laminated with the separator 35 in between and are spirally wound to fabricate a spirally wound body that is a precursor of the spirally wound electrode body 30. Thereafter, the protective tape 37 is adhered to the outermost periphery thereof. Subsequently, after the spirally wound body is sandwiched between two pieces of the film-like outer package members 40, the outermost peripheries except for one side are bonded, for example, by a thermal fusion bonding method and/or the like to obtain the pouch-like outer package member 40. The spirally wound body is contained in the pouch-like outer package member 40. Subsequently, a composition for electrolyte that includes an electrolytic solution, a monomer as a raw material of the polymer compound, a polymerization initiator, and other materials such as a polymerization inhibitor where appropriate is prepared. The composition for electrolyte is injected into the pouch-like outer package member 40, following which the outer package member 40 is hermetically sealed, for example, by a thermal fusion bonding method and/or the like. Subsequently, the monomer is thermally polymerized. Thus, a polymer compound is formed, and therefore, the gel electrolyte layer 36 is formed.

In the third procedure, the spirally wound body is fabricated and contained in the pouch-like outer package member 40 in a manner similar to that of the foregoing second procedure, except that the separator 35 with both surfaces coated with a polymer compound is used. Examples of the polymer compound with which the separator 35 is coated include a polymer (a homopolymer, a copolymer, or a multicomponent copolymer) that includes vinylidene fluoride as a component. Specific examples thereof include polyvinylidene fluoride, a binary copolymer that includes vinylidene fluoride and hexafluoro propylene as components, and a ternary copolymer that includes vinylidene fluoride, hexafluoro propylene, and chlorotrifluoroethylene as components. It is to be noted that other one or more polymer compounds may be used in addition to the polymer that includes vinylidene fluoride as a component. Subsequently, an electrolytic solution is prepared and is injected into the outer package member 40. Thereafter, the opening of the outer package member 40 is hermetically sealed, for example, by a thermal fusion bonding method and/or the like. Subsequently, the outer package member 40 is heated while weight is applied thereto, to allow the separator 35 to be adhered to the cathode 33 and the anode 34 with the polymer compound in between. Thus, the polymer compound is impregnated with the electrolytic solution, and accordingly, the polymer compound is gelated to form the electrolyte layer 36.

In the third procedure, swollenness of the secondary battery is suppressed more as compared with the first procedure. Further, in the third procedure, the materials such as the monomer as the raw material of the polymer compound and the solvent hardly remain in the electrolyte layer 36, unlike in the second procedure. Therefore, the formation step of the polymer compound is favorably controlled. Therefore, sufficient adhesion characteristics are obtained between the cathode 33 and the electrolyte layer 36, between the anode 34 and the electrolyte layer 36, and between the separator 35 and the electrolyte layer 36.

[Functions and Effects of Secondary Battery]

According to the present secondary battery of a laminated film type, the cathode active material layer 33B of the cathode 33 has the configuration similar to that of the cathode active material layer 21B. Therefore, both suppression of exfoliation of the cathode active material layer 33B and improvement in battery characteristics are achieved for the reasons similar to those of the cylindrical type secondary battery. Other functions and effects are similar to those of the cylindrical type secondary battery.

[2. Applications of Secondary Battery]

Next, application examples of the above-described secondary battery will be described.

Applications of the secondary battery are not particularly limited as long as the secondary battery is used for applications such as a machine, a device, an instrument, an apparatus, a system (collective entity of a plurality of devices and the like) that are capable of using the secondary battery, for example, as a driving electric power source, an electric power storage source for electric power storage, etc. When the secondary battery is used as an electric power source, the secondary battery may be used as a main electric power source (electric power source used preferentially), or an auxiliary electric power source (electric power source used instead of a main electric power source or used by being switched from the main electric power source). The main electric power source type is not limited to the secondary battery.

Examples of applications of the secondary battery include mobile electronic apparatuses such as, but not limited to, video camcorders, digital still cameras, mobile phones, notebook personal computers, cordless phones, headphone stereos, portable radios, portable televisions, and personal digital assistants. Further examples thereof include: mobile lifestyle electric appliances such as electric shavers; memory devices such as backup electric power sources and memory cards; electric power tools such as electric drills and electric saws; battery packs used as an electric power source of, for example, notebook personal computers or the like; medical electronic apparatuses such as pacemakers and hearing aids; electric vehicles such as electric automobiles (including hybrid automobiles); and electric power storage systems such as home battery systems for storing electric power, for example, for emergency or the like. It goes without saying that the secondary battery may be also used for applications other than the foregoing applications.

In particular, the secondary battery is effective in applications such as the battery pack, the electric vehicle, the electric power storage system, the electric power tool, and the electronic device. In these applications, since superior battery characteristics are demanded, the characteristics are effectively improved by using the secondary battery according to the above-described embodiments of the present application. It is to be noted that the battery pack may be an electric power source that uses a secondary battery, such as a so-called assembled battery. The electric vehicle may be a vehicle that operates (runs) with the use of a secondary battery as a driving electric power source. As described above, the electric vehicle may be an automobile (such as a hybrid automobile) that includes a drive source other than a secondary battery. The electric power storage system may be a system that uses a secondary battery as an electric power storage source. For example, in a home electric power storage system, electric power is stored in the secondary battery that is an electric power storage source, and the electric power is consumed as necessary. Thus, for example, home electric products and the like become usable. The electric power tool may be a tool in which a movable section (such as a drill) is moved with the use of a secondary battery as a driving electric power source. The electronic apparatus is an apparatus that executes various functions with the use of a secondary battery as a driving electric power source (electric power supply source).

A description will be specifically given of some application examples of the secondary battery. It is to be noted that configurations of the respective application examples described below are mere examples, and may be modified as appropriate.

[2-1. Battery Pack]

Figure 6:
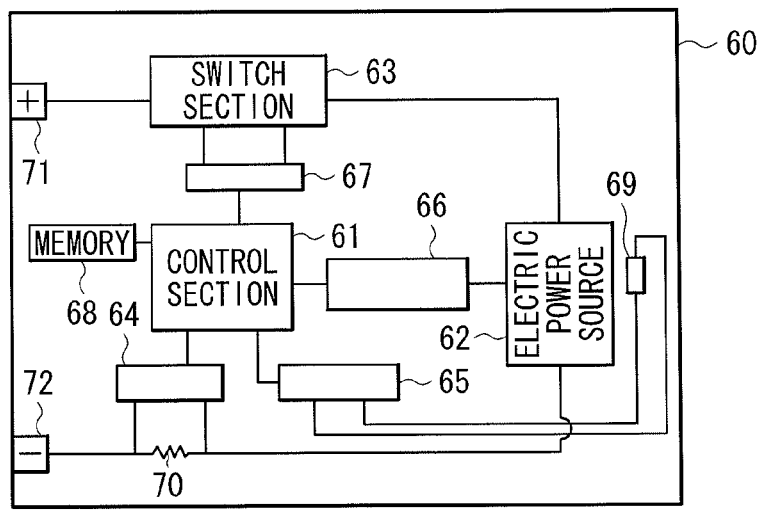
FIG. 6 is a block diagram illustrating a configuration of an application example (battery pack) of the secondary battery.

FIG. 6 illustrates a block configuration of a battery pack. The battery pack may include, for example, a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 in a housing 60 made of materials such as a plastic material, as shown in FIG. 6.

The control section 61 controls operations of the battery pack as a whole (including a used state of the electric power source 62), and may include, for example, a central processing unit (CPU) and/or the like. The electric power source 62 includes one or more secondary batteries (not illustrated). The electric power source 62 may be, for example, an assembled battery including two or more secondary batteries. The secondary batteries may be connected to one another in series, in parallel, or in a combination thereof. As an example, the electric power source 62 includes six secondary batteries connected two in parallel and three in series.

The switch section 63 switches the used state of the electric power source 62 (whether or not the electric power source 62 is connected to an external device) according to an instruction of the control section 61. The switch section 63 may include, for example, a charge control switch, a discharge control switch, a charging diode, a discharging diode, etc. (not illustrated). The charge control switch and the discharge control switch may be, for example, semiconductor switches such as a field-effect transistor (MOSFET) that uses a metal oxide semiconductor.

The current measurement section 64 measures a current with the use of the current detection resistance 70, and outputs the measurement result to the control section 61. The temperature detection section 65 measures temperature with the use of the temperature detection device 69, and outputs the measurement result to the control section 61. The temperature measurement result may be used, for example, for a case in which the control section 61 controls charge and discharge at the time of abnormal heat generation, or for a case in which the control section 61 performs correction processing at the time of calculating a remaining capacity. The voltage detection section 66 measures a voltage of the secondary battery in the electric power source 62, performs analog-to-digital conversion (A/D conversion) on the measured voltage, and supplies the resultant to the control section 61.

The switch control section 67 controls operations of the switch section 63 according to signals inputted from the current measurement section 64 and the voltage measurement section 66.

The switch control section 67 disconnects the switch section 63 (charge control switch) so that a charge current is prevented from flowing in a current path of the electric power source 62 when a battery voltage reaches an overcharge detection voltage, for example. Thus, the electric power source 62 is allowed only to be discharged through the discharging diode. It is to be noted that the switch control section 67 blocks the charge current in the case where a large current flows at the time of charge, for example.

The switch control section 67 disconnects the switch section 63 (discharge control switch) so that a discharge current is prevented from flowing in the current path of the electric power source 62 when a battery voltage reaches an overdischarge detection voltage, for example. Thus, the electric power source 62 is allowed only to be charged through the charging diode. It is to be noted that the switch control section 67 blocks the discharge current in the case where a large current flows at the time of discharge, for example.

It is to be noted that, in the secondary battery, for example, the overcharge detection voltage may be 4.20 V±0.05 V, and the over-discharge detection voltage may be 2.4 V±0.1V.

The memory 68 may be, for example, a memory such as an EEPROM that is a nonvolatile memory. The memory 68 may store, for example, numerical values calculated by the control section 61 and information on the secondary battery measured in a manufacturing process (such as an internal resistance in the initial state). It is to be noted that, when the memory 68 stores information on a full charge capacity of the secondary battery, the control section 10 comprehends information such as a remaining capacity.

The temperature detection device 69 measures temperature of the electric power source 62, and outputs the measurement result to the control section 61. The temperature detection device 69 may be a device such as a thermistor.

The cathode terminal 71 and the anode terminal 72 are terminals to be connected to an external device (such as a notebook personal computer) driven with the use of the battery pack, or terminals to be connected to an external device (such as a battery charger) provided for charging the battery pack. The electric power source 62 is charged and discharged through the cathode terminal 71 and the anode terminal 72.

[2-2. Electric Vehicle]

Figure 7:
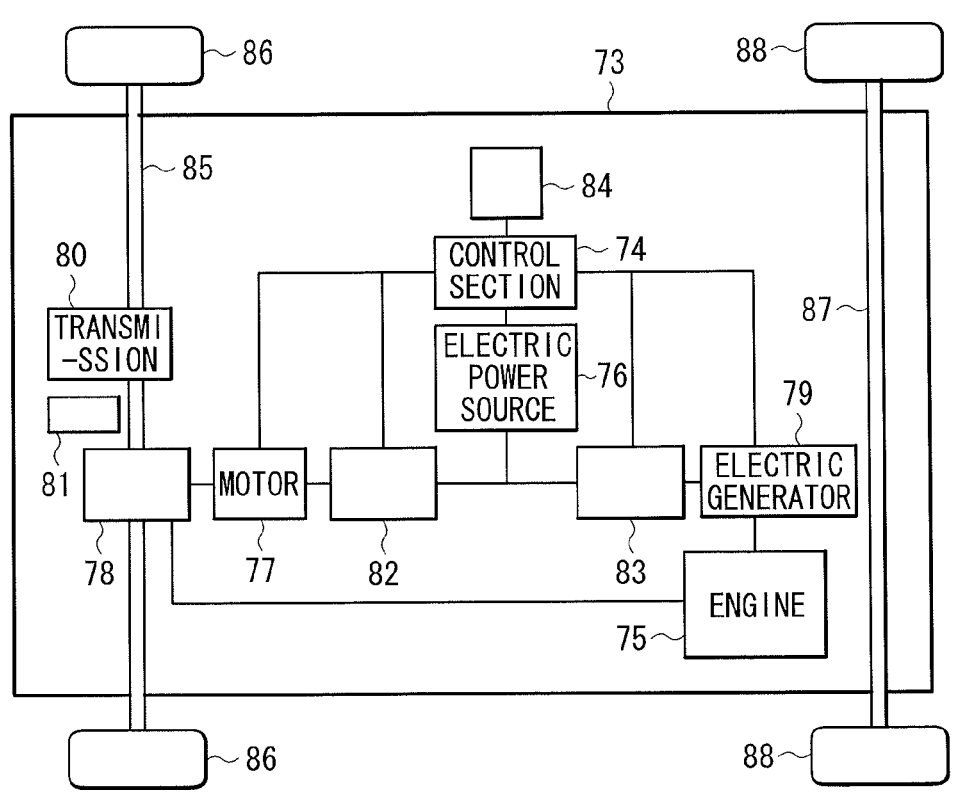
FIG. 7 is a block diagram illustrating a configuration of an application example (electric vehicle) of the secondary battery.

FIG. 7 illustrates a block configuration of a hybrid automobile that is an example of electric vehicles. The electric vehicle may include, for example, a control section 74, an engine 75, an electric power source 76, a driving motor 77, a differential 78, an electric generator 79, a transmission 80, a clutch 81, inverters 82 and 83, and various sensors 84 in a body 73 made of metal, as illustrated in FIG. 7. In addition thereto, the electric vehicle may include, for example, a front tire drive shaft 85 and a front tire 86 that are connected to the differential 78 and the transmission 80, a rear tire drive shaft 87, and a rear tire 88.

The electric vehicle runs with the use of one of the engine 75 and the motor 77 as a drive source. The engine 75 is a main power source, and may be an engine such as a petrol engine. In the case where the engine 75 is used as a power source, drive power (torque) of the engine 75 is transferred, for example, to the front tire 86 or the rear tire 88 through the differential 78, the transmission 80, and the clutch 81 that are drive sections. It is to be noted that the torque of the engine 75 is also transferred to the electric generator 79. Using the torque, the electric generator 79 generates alternating-current electric power, and the alternating-current electric power is converted to direct-current electric power through the inverter 83, and the thus-converted direct-current electric power is stored in the electric power source 76. On the other hand, in the case where the motor 77 that is a conversion section is used as a power source, electric power (direct-current electric power) supplied from the electric power source 76 is inverted to alternating-current electric power through the inverter 82. The motor 77 is driven by the alternating-current electric power. Drive power (torque) converted from the electric power by the motor 77 is transferred, for example, to the front tire 86 or the rear tire 88 through the differential 78, the transmission 80, and the clutch 81 that are the drive sections.

It is to be noted that a scheme may be adopted in which, when speed of the electric vehicle is reduced by an unillustrated brake mechanism, the resistive force at the time of speed reduction is transferred to the motor 77 as torque, and the motor 77 generates alternating-current electric power by the torque. It is preferable that the alternating-current electric power be inverted to direct-current electric power through the inverter 82, and the direct-current regenerative electric power be stored in the electric power source 76.

The control section 74 controls operations of the electric vehicle as a whole, and, for example, may include a CPU and/or the like. The electric power source 76 includes one or more secondary batteries (not illustrated). The electric power source 76 may be so configured as to be connectable to an external electric power source, and as to be allowed to store electric power by receiving electric power from the external electric power source. The various sensors 84 may be used, for example, for controlling the number of rotations of the engine 75 or for controlling opening level (throttle opening level) of an unillustrated throttle valve. The various sensors 84 may include sensors such as, a speed sensor, an acceleration sensor, and an engine speed sensor.

It is to be noted that the description has been given above of the hybrid automobile as an electric vehicle. However, the electric vehicle may be a vehicle (electric automobile) that operates by using only the electric power source 76 and the motor 77 without using the engine 75.

[2-3. Electric Power Storage System]

Figure 8:
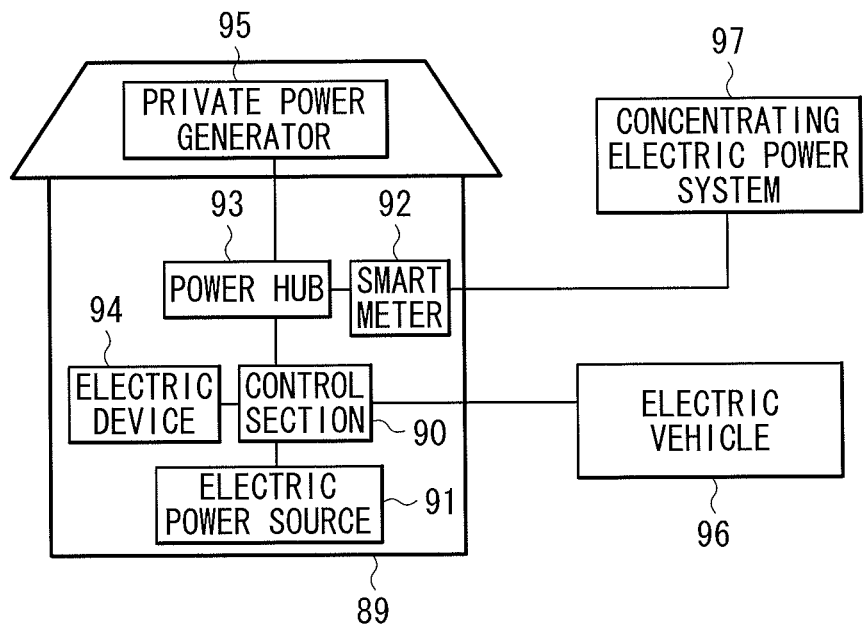
FIG. 8 is a block diagram illustrating a configuration of an application example (electric power storage system) of the secondary battery.

FIG. 8 illustrates a block configuration of an electric power storage system. The electric power storage system may include, for example, a control section 90, an electric power source 91, a smart meter 92, and a power hub 93, inside a house 89 such as a general residence and a commercial building, as illustrated in FIG. 8.

In this example, the electric power source 91 may be connected to an electric device 94 arranged inside the house 89, and may be provided connectable to an electric vehicle 96 parked outside the house 89, for example. Further, the electric power source 91 may be provided connected to a private power generator 95 arranged in the house 89 through the power hub 93, and may be connectable to an external concentrating electric power system 97 thorough the smart meter 92 and the power hub 93, for example.

It is to be noted that the electric device 94 may encompass, for example, one or more home electric appliances such as a refrigerator, an air conditioner, a television, and a water heater. The private power generator 95 may be, for example, one or more of generators such as a solar power generator and a wind-power generator. The electric vehicle 96 may be, for example, one or more of vehicles such as an electric automobile, an electric motorcycle, and a hybrid automobile. The concentrating electric power system 97 may be, for example, one or more of electric power systems such as a thermal power plant, an nuclear power plant, a hydraulic power plant, and a wind-power plant.

The control section 90 controls operations of the electric power storage system as a whole (including a used state of the electric power source 91), and, may include, for example, a CPU and/or the like. The electric power source 91 includes one or more secondary batteries (not illustrated). The smart meter 92 may be, for example, an electric power meter compatible with a network arranged in the house 89 of a consumer of electric power, and may be communicable with a supplier of electric power. Accordingly, for example, while the smart meter 92 communicates with the outside as necessary, the smart meter 92 controls the balance between supply and demand in the house 89 and allows effective and stable energy supply.

In the electric power storage system, for example, electric power is stored in the electric power source 91 from the concentrating electric power system 97 that is an external electric power source through the smart meter 92 and the power hub 93, and electric power is stored in the electric power source 91 from the private power generator 95 that is an independent electric power source through the power hub 93. The electric power stored in the electric power source 91 is supplied to the electric device 94 or the electric vehicle 96 as necessary according to an instruction of the control section 90. Therefore, the electric device 94 becomes operable, and the electric vehicle 96 becomes chargeable. In other words, the electric power storage system is a system that achieves storing and supplying of electric power in the house 89 with the use of the electric power source 91.

The electric power stored in the electric power source 91 is used on an optional basis. Therefore, for example, electric power may be stored in the electric power source 91 from the concentrating electric power system 97 in the middle of the night when an electric rate is inexpensive, and the electric power stored in the electric power source 91 may be used during daytime hours when the electric rate is expensive.

It is to be noted that the above-described electric power storage system may be arranged for each household (family unit), or may be arranged for a plurality of households (a plurality of family units).

[2-4. Electric Power Tool]

Figure 9:
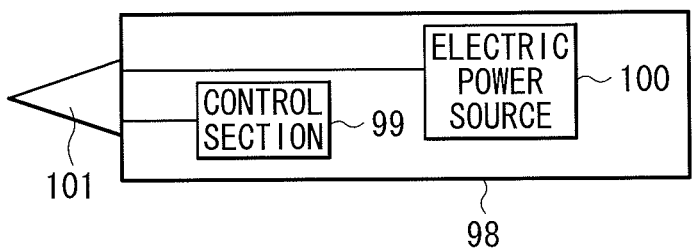
FIG. 9 is a block diagram illustrating a configuration of an application example (electric power tool) of the secondary battery.

FIG. 9 illustrates a block configuration of an electric power tool. The electric power tool may be, for example, an electric drill, and may include, for example, a control section 99 and an electric power source 100 in a tool body 98 made of materials such as a plastic material, as illustrated in FIG. 9. For example, a drill section 101 that is a movable section may be attached to the tool body 98 in an operable (rotatable) manner.

The control section 99 controls an operation of the electric power tool as a whole (including a used state of the electric power source 100), and may include, for example, a CPU and/or the like. The electric power source 100 includes one or more secondary batteries (not illustrated). The control section 99 allows electric power to be supplied from the electric power source 100 to the drill section 101 as necessary to operate the drill section 101 according to manipulation of an unillustrated operation switch.

EXAMPLES

Specific Examples according to the above-described embodiments of the present application will be described in detailed.

Examples 1 to 23

Figure 10:
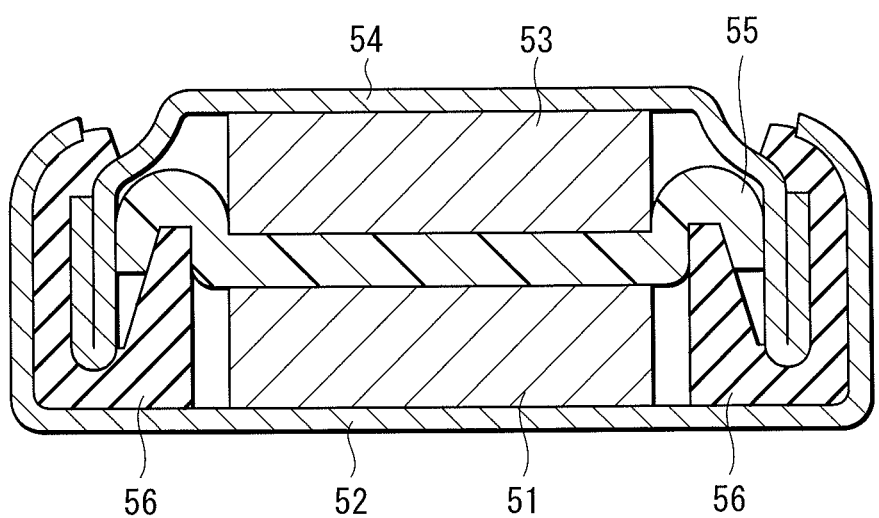
FIG. 10 is a cross-sectional view illustrating a configuration of a test secondary battery (coin-shape type).

Secondary batteries (coin-type lithium ion secondary batteries) for a test illustrated in FIG. 10 were fabricated. The secondary battery included a test electrode 51 and an opposing electrode 53 that were laminated with a separator 55 impregnated with an electrolytic solution in between, and included an outer can 52 and an outer cup 54 that were swaged with a gasket 56. The test electrode 51 that included the cathode active material was contained in the outer can 52, and the opposing electrode 53 that included the anode active material were attached to the outer cup 54.

In fabricating the test electrode 51, 90 parts by mass of the cathode active material (spherical active material), 5 parts by mass of the cathode binder (polyvinylidene fluoride: PVDF), and 5 parts by mass of the cathode conductive agent (2 parts by mass of Ketjen black (registered trademark) and 3 parts by mass of carbon nanotube) were mixed to prepare a cathode mixture. In this case, the content of the cathode binder was increased on an as-necessary basis and the content of the cathode active material was decreased accordingly. The type of the spherical active material, the average particle diameter D1 (μm), and the average degree of circularity C1 were as shown in Table 1. It is to be noted that the synthesis procedure of the spherical active material will be described later. Subsequently, the cathode mixture was dispersed into an organic solvent (N-methyl-2-pyrrolidone: NMP) to prepare paste cathode mixture slurry. Subsequently, the cathode mixture slurry was coated on the strip-like cathode current collector (an aluminum foil with a thickness of 15 μm) and the resultant was dried to form the lower layer, following which the lower layer was compression-molded with a roll-pressing machine. The thickness T1 (μm) of the lower layer was as shown in Table 1.

Subsequently, the upper layer that included the planular active material instead of the spherical active material was formed by a forming procedure similar to that of the above-described lower layer. The type of the planular active material, the average particle diameter D2 (μm), the average degree of circularity C2, and the thickness T2 (μm) of the upper layer were as shown in Table 2. It is to be noted that the synthesis procedure of the planular active material will be described later. Thus, the cathode active material layer that included the lower layer and the upper layer was formed.

Subsequently, the cathode current collector and the cathode active material layer were punched in a pellet-like shape (with a diameter of 15 mm). An lithium metal plate that was punched in a pellet-like shape (with a diameter of 16 mm) was used as the opposing substrate 53.

In preparing the electrolytic solution, the electrolyte salt (LiPF$_6$) was dispersed into the solvent (ethylene carbonate (EC) and ethyl methyl carbonate (EMC)). In this case, the composition of the solvent in volume ratio was EC:EMC=50:50, and the content of the electrolyte salt with respect to the solvent was 1 mol/dm$^3$ (=1 mol/l).

In assembling the secondary battery, the test electrode 51 contained in the outer can 52 and the opposing electrode 53 contained in the outer cup 54 were laminated with a separator 55 (a porous polyolefin film with a thickness of 23 μm) in between. In this case, the outer can 52 and the outer cup 54 were swaged with the gasket 56. Thus, the coin-type secondary battery with a diameter of 20 mm and with a height of 1.6 mm was completed.

Here, the synthesis procedures of the spherical active material and the planular active material were as follows.

In obtaining LiFe$_{0.5}$Mn$_{0.5}$PO$_4$, raw materials thereof including lithium phosphate (Li$_3$PO$_4$), manganese (II) phosphate trihydrate (Mn$_3$(PO$_4$)$_2$·3H$_2$O), iron (II) phosphate octahydrate (Fe$_3$(PO$_4$)$_2$·8H$_2$O) were weighed to be 50 g so that the molar ratio thereof was Li:Mn:Fe:P=1:0.5:0.5:1. Thereafter, the raw materials were put into pure water (200 cm$^3$=200 cc) and the resultant was stirred to obtain raw material slurry. Subsequently, 5 g of maltose was added to the raw material slurry, and then, the resultant was stirred in a tank. Subsequently, the raw material slurry was sufficiently mixed and pulverized by a mechanochemical method to obtain pulverized slurry. In this case, pulverization was performed for 24 hours with the use of a planetary ball mill. Subsequently, the pulverized slurry was dried and granulated by a spray drying method (with aspiration at 200° C.) to obtain precursor powder. Subsequently, the precursor powder was fired under an inert gas atmosphere (N$_2$ of 100%). The average particle diameter D2 was 0.09 μm when firing was performed at 600° C. for 3 hours, and the average particle diameter D1 was 0.35 μm when the firing was performed at 800° C. for 3 hours.

In obtaining LiFePO$_4$, a synthesis procedure similar to that of obtaining LiFe$_{0.5}$Mn$_{0.5}$PO$_4$ was performed except that the raw materials were modified to include lithium phosphate and iron (II) phosphate octahydrate with a molar ratio of Li:Fe:P=1:1:1. The average particle diameter D2 was 0.1 μm when the firing was performed at 600° C. for 3 hours, and the average particle diameter D1 was 0.33 μm when the firing was performed at 800° C. for 3 hours.

In obtaining LiMnPO$_4$, a synthesis procedure similar to that of obtaining LiFe$_{0.5}$Mn$_{0.5}$PO$_4$ was performed except that the raw materials were modified to include lithium phosphate and manganese (II) phosphate trihydrate with a molar ratio of Li:Mn:P=1:1:1. The average particle diameter D2 was 0.09 μm when the firing was performed at 600° C. for 3 hours, and the average particle diameter D1 was 0.41 μm when the firing was performed at 800° C. for 3 hours.

In obtaining Li$_{1.13}$(Mn$_{0.6}$Ni$_{0.2}$Co$_{0.02}$)$_{0.87}$Al$_{0.01}$O$_2$, nickel sulfate (NiSO$_4$), cobalt sulfate (CoSO$_4$), manganese sulfate (MnSO$_4$), and sodium aluminate (NaAlO$_2$) were mixed. In this case, the mixture ratio (molar ratio) was set to be Mn:Ni:Co=60:20:20 and Al:(Mn+Ni+Co)=1:86. Subsequently, the mixture was dispersed into water, and sodium hydroxide (NaOH) was added thereto while the resultant was sufficiently stirred. Thus, manganese-nickel-cobalt-aluminum composite coprecipitated hydroxide was obtained. Subsequently, the coprecipitate was washed with water and was dried, following which lithium hydroxide monohydrate salt was added to the resultant to obtain a precursor. In this case, the mixture ratio (molar ratio) was set to be Li:(Mn+Ni+Co+Al)=113:87. Subsequently, the precursor was fired in the air and was cooled down to room temperature. The average particle diameter D2 was 0.15 μm when the firing was performed at 800° C. for 10 hours, and the average particle diameter D1 was 0.43 μm when the firing was performed at 850° C. for 20 hours.

In obtaining LiCo$_{0.98}$Al$_{0.01}$Mg$_{0.01}$O$_2$, cobalt sulfate, magnesium sulfate, and sodium aluminate that were the raw materials thereof were mixed. In this case, the mixture ratio (molar ratio) was set to be Co:Mg:Al=98:1:1. Subsequently, the mixture was dispersed into water, and then, sodium hydroxide was added thereto while sufficiently stirring the resultant. Thus, manganese-nickel-cobalt-aluminum composite coprecipitated hydroxide was obtained. Subsequently, the coprecipitate was washed with water and was dried, following which lithium hydroxide monohydrate salt was added to the resultant to obtain a precursor. In this case, the mixture ratio (molar ratio) was set to be Li:(Co+Mg+Al)=1:1. Subsequently the precursor was fired in the air and then cooled down to room temperature. The average particle diameter D2 was 0.15 μm when the firing was performed at 800° C. for 4 hours, and the average particle diameter D1 was 0.45 μm when the firing was performed at 900° C. for 5 hours.

In obtaining $LiCo_{1.03}Ni_{0.77}Co_{0.20}Al_{0.03}O_2$, nickel sulfate, cobalt sulfate, and sodium aluminate that were the raw materials thereof were mixed. In this case, the mixture ratio (molar ratio) was set to be Ni:Co:Al=77:20:3. Subsequently, the mixture was dispersed into water, and then, sodium hydroxide was added thereto while sufficiently stirring the resultant. Thus, nickel-cobalt-aluminum composite coprecipitated hydroxide was obtained. Subsequently, the coprecipitate was washed with water and dried, following which lithium hydroxide monohydrate salt was added to the resultant to obtain a precursor. In this case, the mixture ratio (molar ratio) was set to be Li:(Ni+Co+Al)=105:100. Subsequently, the precursor was fired in an oxygen stream, and then was cooled down to room temperature. The average particle diameter D2 was 0.13 μm when the firing was performed at 700° C. for 10 hours, and the average particle diameter D1 was 0.45 μm when the firing was performed at 750° C. for 20 hours.

In obtaining $LiCo_{0.98}Al_{0.01}Mg_{0.01}O_2$ with a large particle diameter, lithium carbonate ($Li_2CO_3$), cobalt carbonate ($CoCO_3$), aluminum hydroxide ($Al(OH)_3$), and magnesium carbonate ($MgCO_3$) that were raw materials thereof were mixed. In this case, the mixture ratio (molar ratio) was set to be Li:Co:Mg:Al=1:0.98:0.01:0.01. Subsequently, the mixture was fired in the air at 900° C. for 5 hours. The average particle diameter D1 was 13 μm.

Various characteristics of the secondary batteries were examined and results shown in Table 3 were obtained.

In examining exfoliation characteristics, after the cathode active material layer was completed (after compression-molded), it was visually determined whether or not the cathode active material layer was exfoliated from the cathode current collector.

In examining load characteristics, constant current constant voltage charge was performed (for 20 hours) under an ambient temperature environment (at 23° C.) at a current of 0.1 C until the battery voltage (with respect to lithium metal) reached the charge voltage (V) shown in Table 3. Thereafter, the battery was discharged at a current of 0.1 C until the battery voltage (with respect to lithium metal) reached 2.5 V and 0.1 C discharge capacity (mAh/g) was measured. Further, 3 C discharge capacity (mAh/g) was measured in a similar manner except that the current provided at discharge was modified to 3 C.

TABLE 1

Lower layer

Spherical active material

| Example | Type | Average particle diameter D1 (μm) | Average degree of circularity C1 | Cathode binder Content (weight %) | Thickness T1 (μm) |
|---|---|---|---|---|---|
| 1 | $LiFe_{0.5}Mn_{0.5}PO_4$ | 0.35 | 0.7 | 5 | 10 |
| 2 | $LiFePO_4$ | 0.33 | 0.8 | 5 | 10 |
| 3 | $LiFePO_4$ | 0.33 | 0.8 | 5 | 10 |
| 4 | $LiMnPO_4$ | 0.41 | 0.7 | 5 | 10 |
| 5 | $Li_{1.13}(Mn_{0.6}Ni_{0.2}Co_{0.2})_{0.87}Al_{0.01}O_2$ | 0.43 | 0.6 | 5 | 10 |
| 6 | $LiCo_{0.98}Al_{0.01}Mg_{0.01}O_2$ | 0.45 | 0.8 | 5 | 10 |
| 7 | $Li_{1.03}Ni_{0.77}Co_{0.20}Al_{0.03}O_2$ | 0.43 | 0.7 | 5 | 10 |
| 8 | $LiCo_{0.98}Al_{0.01}Mg_{0.01}O_2$ | 0.43 | 0.8 | 5 | 10 |
| 9 | $LiCo_{0.98}Al_{0.01}Mg_{0.01}O_2$ | 13 | 0.7 | 5 | 10 |
| 10 | — | — | — | — | — |
| 11 | — | — | — | — | — |
| 12 | — | — | — | — | — |
| 13 | — | — | — | — | — |
| 14 | — | — | — | — | — |
| 15 | — | — | — | — | — |
| 16 | $LiFe_{0.5}Mn_{0.5}PO_4$ | 0.35 | 0.7 | 5 | 100 |
| 17 | $LiFePO_4$ | 0.33 | 0.7 | 5 | 100 |
| 18 | $LiMnPO_4$ | 0.41 | 0.6 | 5 | 100 |
| 19 | $Li_{1.13}(Mn_{0.6}Ni_{0.2}Co_{0.2})_{0.87}Al_{0.01}O_2$ | 0.43 | 0.6 | 5 | 100 |
| 20 | $LiCo_{0.98}Al_{0.01}Mg_{0.01}O_2$ | 0.45 | 0.8 | 5 | 100 |
| 21 | $Li_{1.03}Ni_{0.77}Co_{0.20}Al_{0.03}O_2$ | 0.43 | 0.8 | 5 | 100 |
| 22 | $LiFe_{0.5}Mn_{0.5}PO_4$ | 0.09 | 0.8 | 15 | 100 |
| 23 | $LiCo_{0.98}Al_{0.01}Mg_{0.01}O_2$ | 13 | 0.8 | 5 | 100 |

TABLE 2

Upper layer

Planular active material

| Example | Type | Average particle diameter D2 (μm) | Average degree of circularity C2 | Cathode binder Content (weight %) | Thickness T2 (μm) |
|---|---|---|---|---|---|
| 1 | $LiFe_{0.5}Mn_{0.5}PO_4$ | 0.09 | 0.2 | 5 | 90 |
| 2 | $LiFePO_4$ | 0.1 | 0.1 | 5 | 90 |
| 3 | $LiFe_{0.5}Mn_{0.5}PO_4$ | 0.09 | 0.1 | 5 | 90 |
| 4 | $LiMnPO_4$ | 0.09 | 0.2 | 5 | 90 |

TABLE 2-continued

| | | Upper layer | | | | |
|---|---|---|---|---|---|---|
| | | Planular active material | | | | |
| Example | Type | Average particle diameter D2 (μm) | Average degree of circularity C2 | Cathode binder Content (weight %) | Thickness T2 (μm) | |
| 5 | $Li_{1.13}(Mn_{0.6}Ni_{0.2}Co_{0.2})_{0.87}Al_{0.01}O_2$ | 0.15 | 0.1 | 5 | 90 | |
| 6 | $LiCo_{0.98}Al_{0.01}Mg_{0.01}O_2$ | 0.15 | 0.2 | 5 | 90 | |
| 7 | $Li_{1.03}Ni_{0.77}Co_{0.20}Al_{0.03}O_2$ | 0.13 | 0.2 | 5 | 90 | |
| 8 | $LiFePO_4$ | 0.09 | 0.2 | 5 | 90 | |
| 9 | $LiMnPO_4$ | 0.09 | 0.1 | 5 | 90 | |
| 10 | $LiFe_{0.5}Mn_{0.5}PO_4$ | 0.09 | 0.1 | 5 | 100 | |
| 11 | $LiMnPO_4$ | 0.1 | 0.1 | 5 | 100 | |
| 12 | $LiMnPO_4$ | 0.09 | 0.2 | 5 | 100 | |
| 13 | $Li_{1.13}(Mn_{0.6}Ni_{0.2}Co_{0.2})_{0.87}Al_{0.01}O_2$ | 0.15 | 0.1 | 5 | 100 | |
| 14 | $LiCo_{0.98}Al_{0.01}Mg_{0.01}O_2$ | 0.15 | 0.2 | 5 | 100 | |
| 15 | $Li_{1.03}Ni_{0.77}Co_{0.20}Al_{0.03}O_2$ | 0.13 | 0.2 | 5 | 100 | |
| 16 | — | — | — | — | — | |
| 17 | — | — | — | — | — | |
| 18 | — | — | — | — | — | |
| 19 | — | — | — | — | — | |
| 20 | — | — | — | — | — | |
| 21 | — | — | — | — | — | |
| 22 | — | — | — | — | — | |
| 23 | — | — | — | — | — | |

TABLE 3

| Example | Charge voltage (V) | Exfoliation | 0.1 C discharge capacity (mAh/g) | 3 C discharge capacity (mAh/g) |
|---|---|---|---|---|
| 1 | 4.25 | No | 153 | 112 |
| 2 | 3.65 | No | 152 | 122 |
| 3 | 4.25 | No | 150 | 116 |
| 4 | 4.25 | No | 153 | 109 |
| 5 | 4.60 | No | 201 | 142 |
| 6 | 4.25 | No | 149 | 122 |
| 7 | 4.25 | No | 185 | 138 |
| 8 | 4.25 | No | 149 | 115 |
| 9 | 4.25 | No | 149 | 105 |
| 10 | — | Yes | — | — |
| 11 | — | Yes | — | — |
| 12 | — | Yes | — | — |
| 13 | — | Yes | — | — |
| 14 | — | Yes | — | — |
| 15 | — | Yes | — | — |
| 16 | 4.25 | No | 152 | 31 |
| 17 | 3.65 | No | 149 | 56 |
| 18 | 4.25 | No | 154 | 15 |
| 19 | 4.60 | No | 203 | 82 |
| 20 | 4.25 | No | 149 | 78 |
| 21 | 4.25 | No | 186 | 98 |
| 22 | 4.25 | No | 146 | 52 |
| 23 | 4.25 | No | 148 | 65 |

In the examples where the average particle diameter D1 of the spherical active material (primary particles) included in the lower layer was larger than the average particle diameter D2 of the planular active material (primary particles) included in the upper layer, more favorable results were obtained compared to the examples where the above-mentioned condition was not satisfied.

In detail, in the examples (Examples 1 to 9) where the cathode active material layer included the lower layer and the upper layer, the cathode active material layer did not exfoliate after compression-molding, unlike in the examples (Examples 10 to 15) where the cathode active material layer included only the upper layer. In addition thereto, in the examples where the cathode active material layer included the lower layer and the upper layer, 0.1 C discharge capacity substantially equivalent to that in the examples (Examples 16 to 23), where the cathode active material included only the lower layer, was obtained. Also, 3 C discharge capacity was significantly increased. It is to be noted that, in the examples (Examples 10 to 15) where the cathode active material was exfoliated, 0.1 C discharge capacity and 3 C discharge capacity were not measurable. From these results, it was confirmed that suppression of exfoliation of the cathode active material layer and improvement in battery characteristics were both achieved when the cathode active material layer included the upper layer and the lower layer.

Hereinabove, the present application has been described with reference to the preferred embodiments and the Examples. However, the present application is not limited to the examples described in the preferred embodiments and the Examples, and may be variously modified. For example, the electrode of the present application may be applied to other applications such as a capacitor.

Further, for example, the second battery of the present application may be similarly applicable to a secondary battery in which a capacity of an anode includes a capacity derived from insertion and extraction of lithium ions and a capacity according to precipitation and dissolution of lithium metal, and in which a battery capacity is represented by the sum of those capacities. In this case, an anode material capable of inserting and extracting lithium ions is used as the anode active material. In addition thereto, a chargeable capacity of the anode material is set to be smaller than the discharge capacity of the cathode.

Further, the preferred embodiments and the Examples have been described with reference to a battery that has a cylindrical type or a laminated film type battery structure and that has a battery device of a spirally wound structure. However, the secondary battery of the present application is not limited thereto, and may be similarly applicable to, for example, a battery that has other battery structure such as a square type and a button type and a battery in which the battery device has other structure such as a lamination structure.

Further, the preferred embodiments and the Examples have been described with reference to the case where lithium is used as the electrode reactant. However, the electrode reactant is not limited thereto, and may be, for example, other Group 1 elements such as Na and K, Group 2 elements such as Mg and Ca, or other light metal such as Al. Since the effects of the present application may be obtained irrespective of electrode reactant type, similar effects are obtainable even if the electrode reactant type is modified.

Further, in the preferred embodiments and the Examples, an appropriate range derived from the results of the Examples has been described for the average degree of circularity. However, the description thereof does not necessarily deny the possibility that the average degree of circularity may be out of the above-described range. In other words, the appropriate range described above is merely a range particularly preferable in obtaining the effects of the present application. Therefore, the average degree of circularity is allowed to be out of the above-described range in some degree as long as the effects of the present application are obtainable. This is also applicable to the average particle diameters (D50) and the content ratio of the binder.

It is possible to achieve at least the following configurations from the above-described example embodiments of the disclosure.

(1) A secondary battery including:
a cathode including a cathode active material layer on a cathode current collector;
an anode; and
an electrolytic solution,
the cathode active material layer including spherical active materials each being a secondary particle and planular active materials each being a secondary particle, the spherical active materials each being included in a region closer to the cathode current collector, and the planular active materials each being included in a region farther from the cathode current collector, and
primary particles of the spherical active materials having an average particle diameter that is larger than an average particle diameter of primary particles of the planular active materials.

(2) The secondary battery according to (1), wherein the cathode active material layer includes a first layer and a second layer, the first layer including the spherical active materials, and the second layer including the planular active materials.

(3) The secondary battery according to (1) or (2), wherein the spherical active materials have an average degree of circularity that is higher than an average degree of circularity of the planular active materials.

(4) The secondary battery according to any one of (1) to (3), wherein the spherical active materials have an average degree of circularity that is equal to or higher than about 0.6, and the planular active materials have an average degree of circularity that is equal to or lower than about 0.2.

(5) The secondary battery according to any one of (1) to (4), wherein
the average particle diameter of the primary particles of the spherical active materials is larger than about 0.1 micrometer and is smaller than about 30 micrometers, and
the average particle diameter of the primary particles of the planular active materials is larger than about 0.01 micrometer and is smaller than 1 micrometer.

(6) The secondary battery according to (2), wherein the first layer has a thickness that is smaller than a thickness of the second layer.

(7) The secondary battery according to any one of (1) to (6), wherein the spherical active materials, the planular active materials, or both include one or more of compounds represented by the following Formula (1) to Formula (5):

$$LiCo_aM1_{1-a}O_2 \quad (1)$$

where M1 includes one or more of Mg, Al, and Ba, and a satisfies $0<a\leq 1$;

$$Li_{1+b}Ni_cCo_{1-c-d}M2_dO_2 \quad (2)$$

where M2 includes one or more of Mg, Al, Mn, and Ba, and b to d satisfy $0\leq b<0.1$ and $0<c+d<1$;

$$Li_{1+e}(Mn_fNi_gCo_{1-f-g-h}M3_h)_{1-e}O_2 \quad (3)$$

where M3 includes one or more of Mg, Al, Zn, Ti, and V, and e to h satisfy $0.05\leq e<0.25$, $0.5\leq f<0.7$, $0\leq g<(1-f)$, and $0.001\leq h<0.05$;

$$LiM4PO_4 \quad (4)$$

where M4 includes one or more of Fe, Mn, and Co; and $$Li_iMn_{2-j}M5_jO_kF_m \quad (5)$$

where M5 includes one or more of Co, Ni, Mg, Al, B, Ti, V, Cr, Fe, Cu, Zn, Mo, Sn, Ca, Sr, and W, and I to k and m satisfy $0.9\leq i\leq 1.1$, $0\leq j\leq 0.6$, $3.7\leq k\leq 4.1$, and $0\leq m\leq 0.1$.

(8) The secondary battery according to (2), wherein
the first layer includes a first binder,
a ratio of a content of the first binder with respect to a total content of the spherical active materials and the first binder in the first layer is higher than about 0.5 weight percent and lower than about 5 weight percent,
the second layer includes a second binder, and
a ratio of a content of the second binder with respect to a total content of the planular active materials and the second binder in the second layer is higher than about 2 weight percent and lower than about 10 weight percent.

(9) The secondary battery according to any one of (1) to (8), wherein the secondary battery is a lithium ion secondary battery.

(10) An electrode including
an active material layer on a current collector,
the active material layer including spherical active materials each being a secondary particle and planular active materials each being a secondary particle, the spherical active materials each being included in a region closer to the current collector, and the planular active materials each being included in a region farther from the current collector, and
primary particles of the spherical active materials having an average particle diameter that is larger than an average particle diameter of primary particles of the planular active materials.

(11) A battery pack including:
the secondary battery according to any one of (1) to (9);
a control section controlling a used state of the secondary battery; and
a switch section switching the used state of the secondary battery according to an instruction of the control section.

(12) An electric vehicle including:
the secondary battery according to any one of (1) to (9);
a conversion section converting electric power supplied from the secondary battery into drive power;
a drive section operating according to the drive power; and
a control section controlling a used state of the secondary battery.

(13) An electric power storage system including:
the secondary battery according to any one of (1) to (9);
one or more electric devices supplied with electric power from the secondary battery; and
a control section controlling the supplying of the electric power from the secondary battery to the one or more electric devices.

(14) An electric power tool including:
the secondary battery according to any one of (1) to (9); and
a movable section being supplied with electric power from the secondary battery.

(15) An electronic apparatus including
the secondary battery according to any one of (1) to (9) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery comprising:
a cathode including a cathode active material layer on a cathode current collector;
an anode; and
an electrolytic solution, wherein:
the cathode active material layer includes spherical secondary active material particles each comprising a plurality of first primary particles and planar secondary active material particles each comprising a plurality of second primary particles,
the spherical secondary active material particles are each included in a first region of the cathode active material layer and the planar secondary active material particles are each included in a second region of the cathode active material layer that is farther from the cathode current collector than the first region,
the first primary particles have an average particle diameter that is larger than an average particle diameter of the second primary particles, and
the spherical secondary active material particles have an average degree of circularity that is larger than an average degree of circularity of the planar secondary active material particles.

2. The secondary battery according to claim 1, wherein:
the cathode active material layer includes a first layer and a second layer,
each of the spherical secondary active material particles are included in the first layer, and
each of the planar secondary active material particles are included in the second layer.

3. The secondary battery according to claim 1, wherein the average degree of circularity of the spherical secondary active material particles is greater than or equal to about 0.6.

4. The secondary battery according to claim 1, wherein the average particle diameter of the first primary particles is larger than about 0.1 micrometer and is smaller than about 30 micrometers, and
the average particle diameter of the second primary particles is larger than about 0.01 micrometer and is smaller than 1 micrometer.

5. The secondary battery according to claim 2, wherein the first layer has a thickness that is smaller than a thickness of the second layer.

6. The secondary battery according to claim 1, wherein at least one of the spherical secondary active material particles and the planar secondary active material particles comprises at least one compound represented by the following Formula (1) to Formula (5):

$$LiCo_aM1_{1-a}O_2 \quad (1)$$

where M1 includes one or more of Mg, Al, and Ba, and a satisfies $0 < a \leq 1$;

$$Li_{1+b}Ni_cCo_{1-c-d}M2_dO_2 \quad (2)$$

where M2 includes one or more of Mg, Al, Mn, and Ba, and b to d satisfy $0 \leq b < 0.1$ and $0 < c+d < 1$;

$$Li_{1+e}(Mn_fNi_gCo_{1-f-g-h}M3h)_{1-e}O_2 \quad (3)$$

where M3 includes one or more of Mg, Al, Zn, Ti, and V, and e to h satisfy $0.05 \leq e < 0.25$, $0.5 \leq f < 0.7$, $0 \leq g < (1-f)$, and $0.001 \leq h < 0.05$;

$$LiM4PO_4 \quad (4)$$

where M4 includes one or more of Fe, Mn, and Co; and $$Li_iMn_{2-j}M5_jO_kF_m \quad (5)$$

where M5 includes one or more of Co, Ni, Mg, Al, B, Ti, V, Cr, Fe, Cu, Zn, Mo, Sn, Ca, Sr, and W, and i to k and m satisfy $0.9 \leq i \leq 1.1$, $0 \leq j \leq 0.6$, $3.7 \leq k \leq 4.1$, and $0 \leq m \leq 0.1$.

7. The secondary battery according to claim 2, wherein
the first layer includes a first binder,
a ratio of a content of the first binder with respect to a total content of the spherical secondary active material particles and the first binder in the first layer is higher than about 0.5 weight percent and lower than about 5 weight percent,
the second layer includes a second binder, and
a ratio of a content of the second binder with respect to a total content of the planar secondary active material particles and the second binder in the second layer is higher than about 2 weight percent and lower than about 10 weight percent.

8. The secondary battery according to claim 1, wherein the secondary battery is a lithium ion secondary battery.

9. The secondary battery according to claim 1, wherein the average degree of circularity of the planar secondary active material particles is less than or equal to about 0.2.

10. An electrode comprising
an active material layer on a current collector, wherein:
the active material layer includes spherical secondary active material particles each comprising a plurality of first primary particles and planar secondary active material particles each comprising a plurality of second primary particles,
the spherical secondary active material particles are each included in a first region of the cathode active material layer, and the planar secondary active material particles are each included in a second region of the cathode active material layer that is farther from the current collector than the first region,
the first primary particles have an average particle diameter that is larger than an average particle diameter of the second primary particles, and
the spherical secondary active material particles have an average degree of circularity that is larger than an average degree of circularity of the planar secondary active material particles.

11. A battery pack comprising:
a secondary battery;
a control section controlling a used state of the secondary battery; and
a switch section switching the used state of the secondary battery according to an instruction of the control section, wherein:
the secondary battery includes:
a cathode including a cathode active material layer on a cathode current collector, an anode, and an electrolytic solution, the cathode active material layer includes spherical secondary active material particles each comprising a plurality of first primary particles and planar secondary active material particles each comprising a plurality of second primary particles, the spherical secondary active material particles are each included in a first region of the cathode active material layer, and the planar secondary active material particles are each included in a second region of the cathode active material layer that is farther from the cathode current collector than the first region, the first primary particles have an average particle diameter that is larger than an average particle diameter of the second primary particles, and the spherical secondary active material particles have an average degree of circularity is larger than an average degree of circularity of the planar secondary active material particles.

* * * * *